(12) United States Patent
Yamazaki

(10) Patent No.: US 8,922,821 B2
(45) Date of Patent: Dec. 30, 2014

(54) IMAGE FORMING APPARATUS CONNECTABLE TO A PORTABLE STORAGE MEDIUM, METHOD OF CONTROLLING THE SAME, AND STORAGE MEDIUM

(75) Inventor: Masahito Yamazaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 593 days.

(21) Appl. No.: 12/771,255

(22) Filed: Apr. 30, 2010

(65) Prior Publication Data

US 2010/0277764 A1 Nov. 4, 2010

(30) Foreign Application Priority Data

Apr. 30, 2009 (JP) ................................. 2009-110720

(51) Int. Cl.
*G06K 15/00* (2006.01)
*G03G 15/00* (2006.01)
*H04N 1/00* (2006.01)
*H04N 1/21* (2006.01)
*H04N 1/32* (2006.01)

(52) U.S. Cl.
CPC ........ *G03G 15/5066* (2013.01); *G03G 15/5041* (2013.01); *G03G 15/5062* (2013.01); *H04N 1/00175* (2013.01); *H04N 1/00965* (2013.01); *H04N 1/2158* (2013.01); *H04N 1/32502* (2013.01); *H04N 2201/0051* (2013.01); *H04N 2201/0008* (2013.01)
USPC ........... 358/1.16; 358/1.1; 358/1.15; 358/1.2; 358/1.9; 358/2.1

(58) Field of Classification Search
CPC ... G03G 15/5066; H04N 1/603; H04N 1/644; H04N 1/00175; H04N 1/00965; H04N 1/2158; H04N 1/32502; H04N 2201/0008; H04N 2201/0051

USPC ................ 358/1.14, 1.9, 504, 523, 534, 1.16; 399/83; 702/85

See application file for complete search history.

(56) References Cited

U.S. PATENT DOCUMENTS 6,243,542 B1 6/2001 Fujimoto et al.
7,389,448 B2 6/2008 Sakai
(Continued)

FOREIGN PATENT DOCUMENTS

CN 1892578 A 1/2007
CN 100359458 C 1/2008
(Continued)

OTHER PUBLICATIONS

English Machine Translation of JP 2006-163761-A (Shirai, Published Jun. 22, 2006).*

(Continued)

*Primary Examiner* — Benny Q Tieu
*Assistant Examiner* — Juan M Guillermety
(74) *Attorney, Agent, or Firm* — Rossi, Kimms & McDowell LLP

(57) ABSTRACT

An image forming apparatus that is capable of accessing a removable storage medium and automatically starting an operation of calibration thereof without waiting for a user to input a job, on an as-needed basis, when a storage medium is mounted therein. A printer engine performs an image forming operation according to data read from the medium, and a controller executes calibration of the printer engine. The controller detects whether or not the medium is inserted, and determines attributes of data stored in the medium. Based on a result of determination, the controller causes the calibration to be selectively started.

10 Claims, 18 Drawing Sheets

(56) References Cited

U.S. PATENT DOCUMENTS

| | | | |
|---|---|---|---|
| 8,117,353 B2* | 2/2012 | Kakizaki | 710/13 |
| 2007/0014538 A1 | 1/2007 | Yamanaka | |
| 2008/0123121 A1* | 5/2008 | Sagimori | 358/1.9 |
| 2008/0180746 A1* | 7/2008 | Morisaki | 358/1.16 |
| 2009/0262381 A1* | 10/2009 | Tsujimoto | 358/1.14 |
| 2010/0014131 A1* | 1/2010 | Cho | 358/504 |
| 2010/0214577 A1* | 8/2010 | Owen | 358/1.9 |

FOREIGN PATENT DOCUMENTS

| | | |
|---|---|---|
| JP | 2000-227684 A | 8/2000 |
| JP | 2003-270880 A | 9/2003 |
| JP | 2004-358694 A | 12/2004 |
| JP | 2005181534 A | 7/2005 |
| JP | 2006-165660 A | 6/2006 |
| JP | 2006163761 A | 6/2006 |
| JP | 2007-150464 A | 6/2007 |
| JP | 2008-298867 A | 12/2008 |

OTHER PUBLICATIONS

English Machine Translation of JP 2006-165660 A (Kashibuchi, Published Jun. 22, 2006).*
KR Office Action issued Aug. 20, 2012 for corresponding KR 10-2010-0040425.
Japanese Office Action issued in Japanese counterpart application No. JP2009-110720, dated Apr. 16, 2013.
KR OA issued Aug. 22, 2013 for corres. KR 10-2010-0040425.
Notice on the first Office Action issued in corresponding CN201210122236 dated Aug. 19, 2014. English translation provided.

* cited by examiner

FIG.8

| | |
|---|---|
| SOI | COMPRESSED DATA START |
| APP1 | APPLICATION MARKER SEGMENT 1 (FOR Exif ADDITIONAL INFORMATION) |
| (APP2) | (APPLICATION MARKER SEGMENT 2) (FOR FlashPix EXTENTION DATA) |
| DQT | QUANTIZATION TABLE |
| DHT | HUFFMAN TABLE |
| (DRI) | (RESTART INTERVAL) |
| SOF | FRAME HEADER |
| SOS | SCAN HEADER |
| | COMPRESSED DATA |
| EOI | END OF COMPRESSED DATA |

| |
|---|
| APP1 Marker |
| APP1 Length |
| Exif IDENTIFICATION CODE |
| TIFF Header |
| 0TH IFD |
| 0TH IFD Value |
| 1ST IFD |
| 1ST IFD Value |
| 1ST IFD IMAGE DATA |

FIG.11

| TOTAL OUTPUT SHEET COUNT AT THE TIME OF PRECEDING CALIBRATION | 32BITS | ← 1ST VARIABLE  901 |
| --- | --- | --- |
| OUTPUT SHEET COUNT INTERVAL WITHIN WHICH AUTOMATIC CALIBRATION IS UNNECESSARY | 8BITS | ← 2ND VARIABLE  902 |
| AUTOMATIC CALIBRATION | 1BIT<br>0: NOT INHIBITED<br>1: INHIBITED | ← 3RD VARIABLE  1101 |
| QUICK CORRECTION OR FULL CORRECTION | 1BIT<br>0: QUICK CORRECTION<br>1: FULL CORRECTION | ← 4TH VARIABLE  1102 |

IMAGE FORMING APPARATUS CONNECTABLE TO A PORTABLE STORAGE MEDIUM, METHOD OF CONTROLLING THE SAME, AND STORAGE MEDIUM

BACKGROUND OF THE INVENTION

1. Field of the Invention

The present invention relates to an image forming apparatus that is capable of accessing a removable storage medium and a method of controlling the image forming apparatus.

2. Description of the Related Art

A printer or multifunction peripheral that expresses colors using color toner or the like is required to perform the calibration of a printer engine so as to perform faithful color reproduction. Particularly, most products which include a printer engine that performs image formation on a medium by an electrophotographic process have a calibration function because the degree of adherence of toner of each color to the medium varies depending on the temperature and humidity of the surrounding environment and conditions of a photosensitive member within the engine.

Hereafter, a description will be given of an example of a procedure of execution of the calibration of the printer engine that employs the electrophotographic process. First, images for density measurement, each of which is called a patch, are formed on an intermediate transfer member of the engine. Assuming cases of several levels of output density, there are formed a plurality of patches in which toner is attached in amounts associated with the respective levels of the patch density. Next, color measurement is performed on the patches by a sensor equipped in the engine, and the differences between the patch densities for realizing the best color reproduction and the actually measured patch densities are calculated. The calibration is accomplished by adjusting laser intensity and controlling printer engine operations including image processing such that the differences are minimized.

The printer or multifunction peripheral that has just been calibrated is adjusted to a state in which the printer engine is capable of reproducing colors with the utmost accuracy. Then, as the number of printed sheets increases thereafter, the printed colors gradually come to deviate from those obtained immediately after the calibration. In a case where a highly accurate color reproduction is demanded of printout, it is desirable to execute printing immediately after the calibration.

However, in general, the calibration is performed only with a predetermined frequency specific to each product of the printer or multifunction peripheral, and when a highly accurate color reproduction is demanded of printout, the engine is not always in a state capable of performing the best color reproduction. To solve this problem, for example, Japanese Patent Laid-Open Publication No. 2000-227684 discloses a technique in which the calibration is automatically started when a print job is input by a user from a host computer.

In the technique disclosed in Japanese Patent Laid-Open Publication No. 2000-227684, if a specific print mode is set, it is possible to forcibly perform the calibration when a print job is input, and hence when a printing operation is started, the engine is ready for performing the best color reproduction.

The method of inputting a print job to a printer or multifunction peripheral includes conventionally proposed methods described hereafter.

For example, in the method disclosed in Japanese Patent Laid-Open Publication No. 2000-227684, a user of a network-connected or serial-connected host computer selects a file, and then inputs a print job for printing the file to a printer or multifunction peripheral. In this case, it takes several tens of seconds or several minutes before the calibration of the printer or multifunction peripheral to which the print job is input is completed after the calibration is started when the user selects the printer or multifunction peripheral.

Further, there has also been proposed a method in which a user of a printer or multifunction peripheral, which is equipped with a unit adapted to recognize a removable memory device inserted therein, designates one of files stored in the inserted memory device, and inputs the selected file to the printer or multifunction peripheral. This method is applied to printers or multifunction peripherals having a so-called memory direct printing function.

Particularly, in recent years, there is an increasing demand for memory direct printing which is configured to be performed by inserting into a printer a memory card storing images captured by a digital camera. Further, it becomes popular to store and carry electronic document files in a memory card or a USB flash memory, and it is also envisaged to use memory direct printing for printing out such office documents under circumstances where no computer is available.

However, even in the case of using memory direct printing, a print job is input after the user selects a file. Therefore, timing of starting the calibration is the same as in the case where the print job is input from the network-connected or serial-connected host computer. Therefore, the user performing memory direct printing is required to wait for several tens of seconds or several minutes before the calibration is completed after inputting the print job.

SUMMARY OF THE INVENTION

The present invention provides an image forming apparatus, a method of controlling the same, and a storage medium storing a program for causing a computer to execute the method. That is, the present invention is directed to enabling an image forming apparatus that is capable of accessing a removable storage medium to automatically start an operation of calibration thereof without waiting for a user to input a job, on an as-needed basis, when a storage medium is mounted therein.

In a first aspect of the present invention, there is provided an image forming apparatus that is capable of having a portable storage medium connected to, comprising a detection unit adapted to detect whether or not the portable storage medium is mounted in the image forming apparatus, a reading unit adapted to read data stored in the portable storage medium which is detected to be mounted, an image forming unit adapted to perform an image forming operation according to the read data, a calibration execution unit adapted to execute calibration of the image forming unit, a determination unit adapted to determine an attribute of the portable storage medium or attributes of data stored in the portable storage medium, and a control unit adapted to perform control based on a result of determination by the determination unit such that the calibration execution unit is selectively caused to start the calibration.

In a second aspect of the present invention, there is provided a method of controlling an image forming apparatus that is capable of having a portable storage medium mounted therein, the image forming apparatus including an image forming unit adapted to perform an image forming operation according to data read from the portable storage medium, and a calibration execution unit adapted to execute calibration of the image forming unit, comprising detecting whether or not the portable storage medium is mounted in the image forming apparatus, determining an attribute of the portable storage medium or attributes of data stored in the portable storage medium, and performing control based on a result of determination by the determining such that the calibration execution unit is selectively caused to start the calibration.

In a third aspect of the present invention, there is provided there is provided a method of calibrating a printing apparatus, comprising prior to receiving an instruction to print a document or file, detecting from use of the document or file or from a log in of a user to the printing apparatus that such a print instruction is likely to be received, and starting calibration of the printing apparatus, before receiving the print instruction, in response to such detection.

In a fourth aspect of the present invention, there is provided a non-transitory computer-readable storage medium which stores a computer-readable program for causing a computer to execute a method of controlling an image forming apparatus that is capable of having a portable storage medium mounted therein, the image forming apparatus including an image forming unit adapted to perform an image forming operation according to data read from the portable storage medium, and a calibration execution unit adapted to execute calibration of the image forming unit, wherein the method comprises detecting whether or not the portable storage medium is mounted in the image forming apparatus, determining an attribute of the portable storage medium or attributes of data stored in the portable storage medium, and performing control based on a result of determination by the determining such that the calibration execution unit is selectively caused to start the calibration.

In a fifth aspect of the present invention, there is provided a non-transitory computer-readable storage medium which stores a computer-readable program for causing a computer to execute a method of calibrating a printing apparatus, comprising prior to receiving an instruction to print a document or file, detecting from use of the document or file or from a log in of a user to the printing apparatus that such a print instruction is likely to be received, and starting calibration of the printing apparatus, before receiving the print instruction, in response to such detection.

In a sixth aspect of the present invention there is provided a printing system comprising a printing apparatus, a pre-print event detector which, prior to receiving an instruction to print a document or file, detects from use of the document or file or from a log in of a user to the printing apparatus that such a print instruction is likely to be received, and a calibration unit which starts calibration of the printing apparatus, before receiving the print instruction, in response to such detection.

By detecting such a pre-print event before receiving the print instruction it is possible to use the time period between the detection of the event and the reception of the print instruction to carry out the calibration automatically in the background.

In one embodiment, the print instruction is received at the printing apparatus. For example, the print instruction may be provided at a user interface of the printing apparatus. The pre-print event may also be detected at the printing apparatus but it may alternatively be detected at another apparatus connected with the printing apparatus. This other apparatus then serves as a notification apparatus which detects the pre-print event and notifies the printing apparatus of the detection.

In one embodiment, the printing system further comprises a print server and a client apparatus. The print server, client apparatus and printing apparatus may be connected via a network such as a LAN. A document or file to be printed is first sent from the client apparatus to the print server. The print server subsequently sends the document or file, possibly after converting its format, to the printing apparatus. The sending of the document or file from the print server to the printing apparatus may be delayed until the user logs into the printing apparatus.

The printing system may comprise two or more printing apparatuses. In this case, the user may select the printing apparatus after the document or file has been sent to the print server, for example by logging in to one of the printing apparatuses. The print server and selected printing apparatus cooperate so that the document or file, or all documents or files sent by the user for printing, are sent from the print server to the selected printer.

After logging in to the printing apparatus, the user may perform one or more steps prior to giving a print instruction. For example, the user may select one or more documents or files to be printed, for example from a list of printable documents or files displayed at the user interface of the printing apparatus. The user may also carry out other activities on the listed documents or files, for example deletion of selected documents or files. The user may also change the print settings of one or more documents or files (e.g. the paper size or finishing settings) before issuing the print instruction. These steps take time, making it effective to start calibration during this time. This can be accomplished by detecting the log in as a pre-print event. It can also be accomplished by detecting as a pre-print event any suitable use of the document or file indicating that a print instruction is likely to be received. Sending of the document or file by the client apparatus or the print server could be detected as a pre-print event. Similarly, receiving of the document or file by the print server or printing apparatus could be detected as a pre-print event.

The pre-print event detector may be provided in the printing apparatus. For example, the pre-print event detector in the printing apparatus may detect when the user logs in to the printing apparatus. Or it may detect when the document or file to be printed is received at the printing apparatus from the print server.

The pre-print event detector may be provided in the print server. For example, the pre-print event detector in the print server may detect when the document or file to be printed is received at the print server from the client apparatus. In a printing system having more than printing apparatus, it is not certain at this stage which printing apparatus the user will select to print the document or file. However, if the user has a history of selecting a particular printing apparatus, for example the one nearest his or her desk, then receipt of the document or file at the print server can be used validly as a pre-print event indicating that a print instruction is likely to be received at the particular printing apparatus. Thus, it is worthwhile to start calibration of the particular printing apparatus, even though there is still a possibility that the user will select a different printing apparatus.

The pre-print event detector in the print server may also detect when the document or file to be printed is sent from the print server to the printing apparatus. This is useful in a printing system having more than one printing apparatus.

The pre-print event detector in the print server may also detect when the user logs in to the printing apparatus. In general, the print server controls and/or manages the printing apparatus(es) in the printing system. The print server may therefore be involved in logging in the user to the printing apparatus, or will at least be notified by the printing apparatus when such a log in occurs.

The pre-print event detector may also be provided in the client apparatus. For example, the pre-print event detector in the client apparatus may detect when the document or file is sent from the client apparatus to the print server. As noted above, in a printing system having more than one printing apparatus, this sending can be used validly as a pre-print event if the user has a history of selecting a particular printing apparatus. Also, some printing systems which have more than one printing apparatus still allow the user to select the printing apparatus at the client apparatus. In this case, the sending of the document or file from the print server to the print server is a valid pre-print event.

The pre-print event to be detected by the pre-print event detector can be any suitable use of the document or file and is not limited to sending or receiving of the document or file by one of the elements of the printing system. For example, the use of the document or file could be storage at the print server, for example in a print queue corresponding to the selected printing apparatus. Or it could be a request from the selected printing apparatus to the print server for the document or file or for all documents or files which the user has sent to the print server. Such a request may be issued when the user logs in to the printing apparatus. Also, in a printing system which has more than one printing apparatus but which still allows the user to select the printing apparatus at the client apparatus, the selection of the printing apparatus at the client apparatus could be a valid pre-print event.

In a seventh aspect of the present invention there is provided a printing apparatus comprising a pre-print event detector which, prior to receiving an instruction to print a document or file, detects from use of the document or file or from a log in of a user to the printing apparatus that such a print instruction is likely to be received, and a calibration unit which starts calibration of the printing apparatus, before receiving the print instruction, in response to such detection.

In an eighth aspect of the present invention there is provided a printing apparatus comprising a document or file receiving unit which receives from a connected apparatus a document or file to be printed, a pre-print event notification receiving unit which, prior to receiving an instruction to print such a received document or file, receives from the connected apparatus or from a further connected apparatus a notification of detection of a pre-print event indicating that such a print instruction is likely to be received, and a calibration unit which starts calibration of the printing apparatus, before receiving the print instruction, in response to the received notification.

The notification may be received before or after the document or file to be printed is received.

In a ninth aspect of the present invention there is provided a notification apparatus adapted to be connected to a printing apparatus that receives a document or file to be printed from the notification apparatus or from a further connected apparatus and that is capable of starting calibration of the printing apparatus, before receiving an instruction to print such a received document or file, in response to a notification, the notification apparatus comprising a pre-print event detector which, prior to receipt by the printing apparatus of such a print instruction, detects from use of the document or file or from a log in of a user to the printing apparatus that such a print instruction is likely to be received, and a pre-print event notification unit which sends the notification to the printing apparatus, before the receipt by the printing apparatus of the print instruction, in response to such detection.

The notification apparatus may be a print server or a client apparatus, for example in a secure printing system. The notification may be received before or after the document or file to be printed is received by the printing apparatus.

In a tenth aspect of the present invention there is provided a method of calibrating a printing apparatus comprising receiving from a connected apparatus a document or file to be printed, prior to receiving an instruction to print such a received document or file, receiving from the connected apparatus or from a further connected apparatus a notification of detection of a pre-print event indicating that such a print instruction is likely to be received, and starting calibration of the printing apparatus, before receiving the print instruction, in response to the received notification.

In an eleventh aspect of the present invention there is provided a method of controlling a notification apparatus adapted to be connected to a printing apparatus that receives a document or file to be printed from the notification apparatus or from a further connected apparatus and that is capable of starting calibration of the printing apparatus, before receiving an instruction to print such a received document or file, in response to a notification, the method comprising prior to receipt by the printing apparatus of such a print instruction, detecting from use of the document or file or from a log in of a user to the printing apparatus that such a print instruction is likely to be received, and sending the notification to the printing apparatus, before the receipt by the printing apparatus of the print instruction, in response to such detection.

In a twelfth aspect of the present invention there is provided a non-transitory computer-readable storage medium storing a computer-readable program which, when executed by a programmable printing apparatus, causes the printing apparatus to receive from a connected apparatus a document or file to be printed, prior to receiving an instruction to print such a received document or file, receive from the connected apparatus or from a further connected apparatus a notification of detection of a pre-print event indicating that such a print instruction is likely to be received, and start calibration of the printing apparatus, before receiving the print instruction, in response to the received notification.

In a thirteenth aspect of the present invention there is provided a non-transitory computer-readable storage medium storing a computer-readable program to be executed by a programmable notification apparatus, the notification apparatus being adapted to be connected to a printing apparatus that receives a document or file to be printed from the notification apparatus or from a further connected apparatus and that is capable of starting calibration of the printing apparatus, before receiving an instruction to print such a received document or file, in response to a notification, and the program when executed causing the notification apparatus to prior to receipt by the printing apparatus of such a print instruction, detect from use of the document or file or from a log in of a user to the printing apparatus that such a print instruction is likely to be received, and send the notification to the printing apparatus, before the receipt by the printing apparatus of the print instruction, in response to such detection.

The printing apparatus in any of the third to twelfth aspects of the present invention need not be capable of having a removable memory connected thereto as in the first and second aspects of the invention.

In an embodiment of the first and second aspects of the present invention, an image forming apparatus capable of accessing a removable storage medium can automatically start an operation of calibration thereof without waiting for a user to input a job, on an as-needed basis, when a storage medium is mounted therein. This makes it possible for the user to reduce time during which he/she is compelled to wait for the calibration to be completed.

In a fourteenth aspect of the present invention there is provided an image forming apparatus capable of having a memory card connected thereto, the apparatus comprising a detector which detects when such a memory card is connected to the apparatus, and a calibration unit which causes calibration of the image forming apparatus to start automatically in response to the detection of such a memory card by the detector.

In such an image forming apparatus calibration can start automatically when a memory card (which is likely to store images captured by a digital camera) is connected to (inserted into) the apparatus.

In a fifteenth aspect of the present invention, there is provided an image forming apparatus capable of having first and second different types of external memory media connected thereto, the apparatus comprising a detector which detects when a memory medium of either of the types is connected to the apparatus and which type of memory medium is connected, and a calibration unit which causes calibration of the image forming apparatus to start automatically when it is detected by the detector that a memory medium of the first type is connected and which causes calibration of the image forming apparatus to start selectively when it is detected by the detector that a memory medium of the second type is connected.

The first type of memory medium may be a type of memory medium likely to store images captured by a digital camera, for example a memory card. For such media, calibration is likely to be necessary to obtain high quality prints of the images on the medium, so starting the calibration automatically is efficient. The second type of memory medium may be a type of memory medium less likely than the first type of memory medium to store such images, for example a USB mass storage device. For such media, calibration is less likely to be necessary to obtain satisfactory prints, so the calibration may be selective. For example, the calibration may be started only if one or more prescribed criteria are met, e.g. a substantial time has elapsed since the last calibration or a substantial change in environmental conditions has occurred.

Further features of the present invention will become apparent from the following description of exemplary embodiments with reference to the attached drawings.

BRIEF DESCRIPTION OF THE DRAWINGS

FIG. 8 is a diagram of the basic structure of an Exif-compliant JPEG file.

FIG. 11 is a diagram showing calibration requirement-setting information used by an image forming apparatus according to a second embodiment of the present invention.

DETAILED DESCRIPTION OF THE EMBODIMENTS

The present invention will now be described in detail below with reference to the accompanying drawings showing embodiments thereof.

Figure 1:
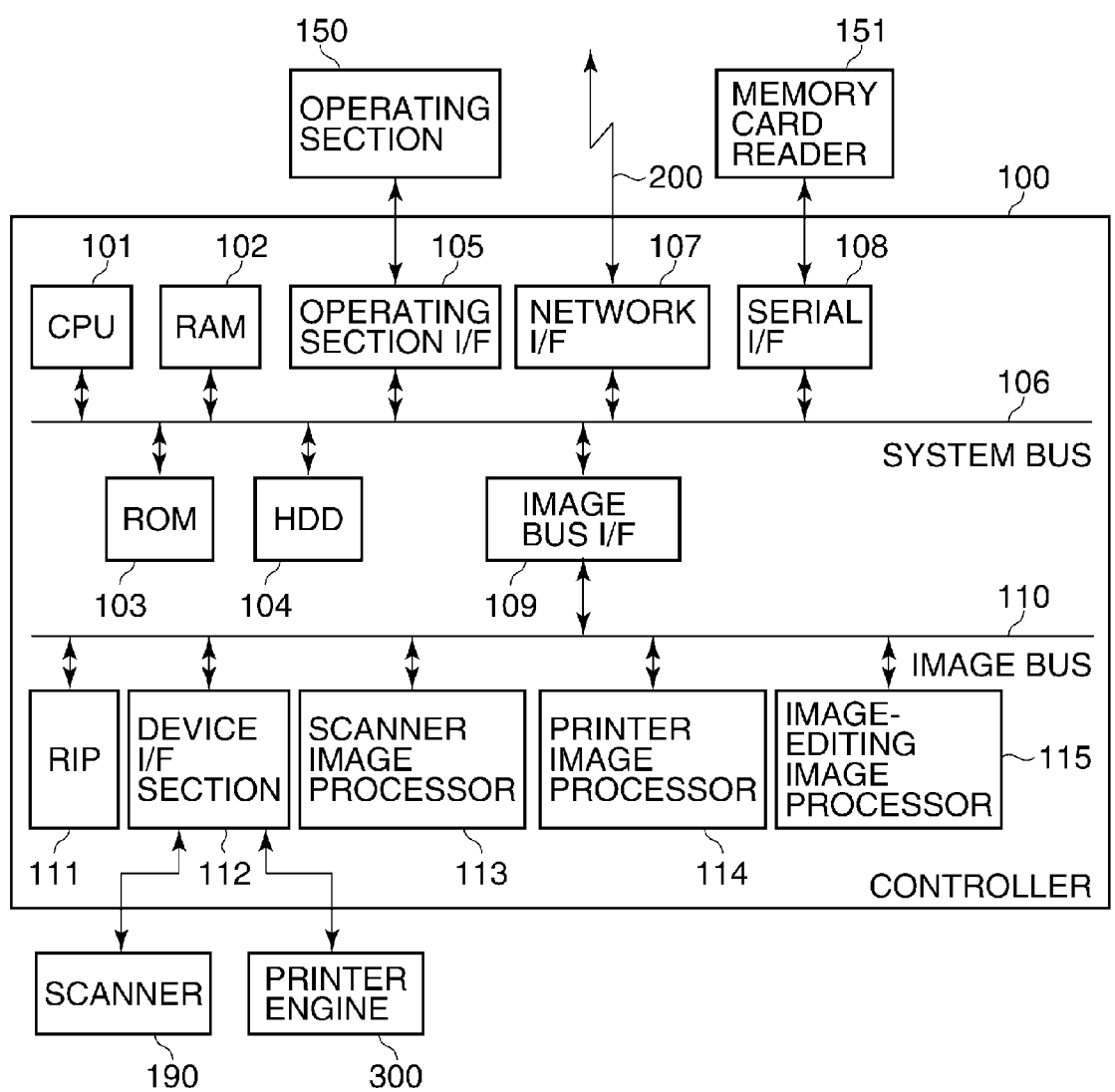
FIG. 1 is a block diagram of a controller of a digital multifunction peripheral as an example of an image forming apparatus according to a first embodiment of the present invention.

FIG. 1 is a block diagram of a controller 100 of a digital multifunction peripheral as an example of an image forming apparatus according to a first embodiment of the present invention.

In FIG. 1, the controller 100 is connected to a scanner 190 as an image input device and a printer engine 300 (image forming unit) as an image output device, and carries out control for scanning and printing out image data. Further, the controller 100 is connected to a LAN 200 to thereby carry out control for inputting and outputting image information and device information via the LAN 200.

A CPU (Central Processing Unit) 101 controls the overall operation of the digital multifunction peripheral. A RAM (Random Access Memory) 102 serves as a system work memory for operating the CPU 101, and at the same time as a memory for temporarily storing input document and image data. Further, a ROM (Read Only Memory) 103 is a boot ROM which stores a boot program for the system. An HDD (Hard Disk Drive) 104 stores system software for various kinds of processing and input image data. An operating section interface 105 is an interface to an operating section 150 including a display screen which is capable of displaying image data or the like, and operation screen data is input to the operating section 150 via the operating section interface 105. Further, via the operating section interface 105, information input by an operator from the operating section 150 is input to the CPU 101. The operating section 150 is thus connected to the controller 100 via the operating section interface 105, and is implemented by a liquid crystal touch panel for providing a user interface for operating an image input/output system of the digital multifunction peripheral.

A network interface 107 is connected to the LAN 200, and performs inputting and outputting information to and from external devices. The units mentioned above are arranged on a system bus 106.

A serial interface 108 is a general-purpose serial bus, and in the present embodiment has a memory card reader 151 connected thereto which is capable of mounting external memory media. The memory card reader 151 is thus connected to the controller 100 via the serial interface 108, and provides a data read/write function for reading/writing data from/into the external memory media.

An image bus interface 109 is an interface for connecting between the system bus 106 and an image bus 110 for high-speed transfer of image data, and is a bus bridge that transforms data structure. Connected to the image bus 110 are a raster image processor 111, a device interface section 112, a scanner image processor 113, a printer image processor 114, and an image-editing image processor 115.

The raster image processor (RIP) 111 rasterizes a page description language (PDL) code and a display list (DL) into images. The device interface section 112 connects the scanner 190 and the printer engine 300 to the controller 100. Further, the device interface section 112 provides a function for controlling e.g. a calibration operation on the printer engine 300.

The scanner image processor 113 performs various kinds of processing on the image data input from the scanner 190, such as correction, conversion, and editing. The printer image processor 114 performs various kinds of processing on image data to be printed out, such as correction and resolution conversion, in dependence on the printer engine. The image-editing image processor 115 performs various kinds of image processing, such as rotation and expansion or compression of an image.

Figure 2:
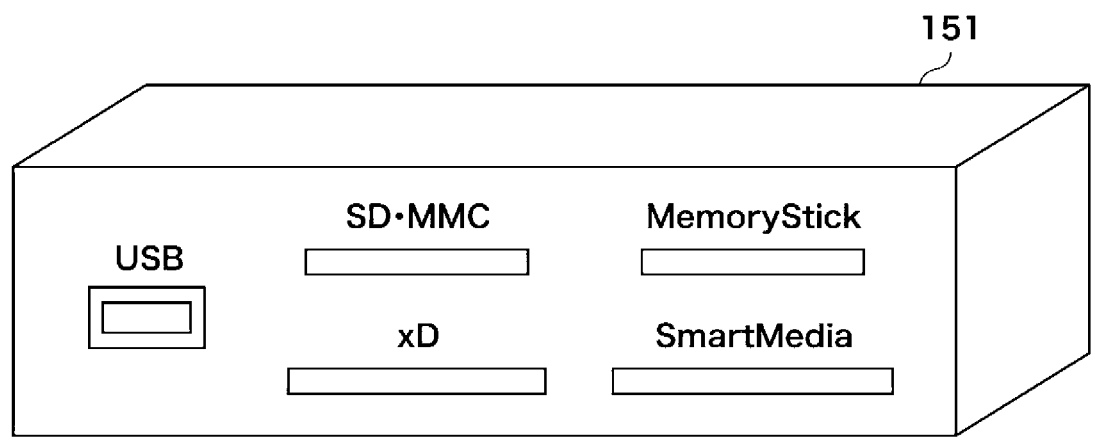
FIG. 2 is a perspective view of the appearance of a memory card reader appearing in FIG. 1.

FIG. 2 is a perspective view of the appearance of the memory card reader 151 appearing in FIG. 1.

Slots of the memory card reader 151 for having removable external memory media inserted therein are roughly divided into a USB-A terminal suitable for being connected to a USB mass storage device, and a group of a plurality of slots suitable for having memory cards inserted therein. The memory card reader 151 is capable of recognizing the above-mentioned two types of slots (the USB-A terminal and the group of slots for memory cards) as serial buses of respective two different channels. In the present embodiment, the memory card reader 151 is compatible with a USB mass storage device (e.g. USB memory), an SD card, a multi media card (MMC), an xD picture card, a memory stick, and smart media. The memory card reader 151 may be configured to be also compatible with an external memory medium, such as a compact flash (registered trademark) card, in addition to the above. These media, such as a USB mass storage device and a memory card, are examples of a portable storage medium.

The image forming apparatus according to the present embodiment, which is provided with the memory card reader 151 described above, has, for example, the following functions: a function of reading and printing image data or document data stored in an external memory medium, a function of writing image data created by scanning an original by the scanner 190 into an external memory medium, and a function of reading image data or document data stored in an external memory medium and transmitting the same to an external device via the network interface.

Figure 3:
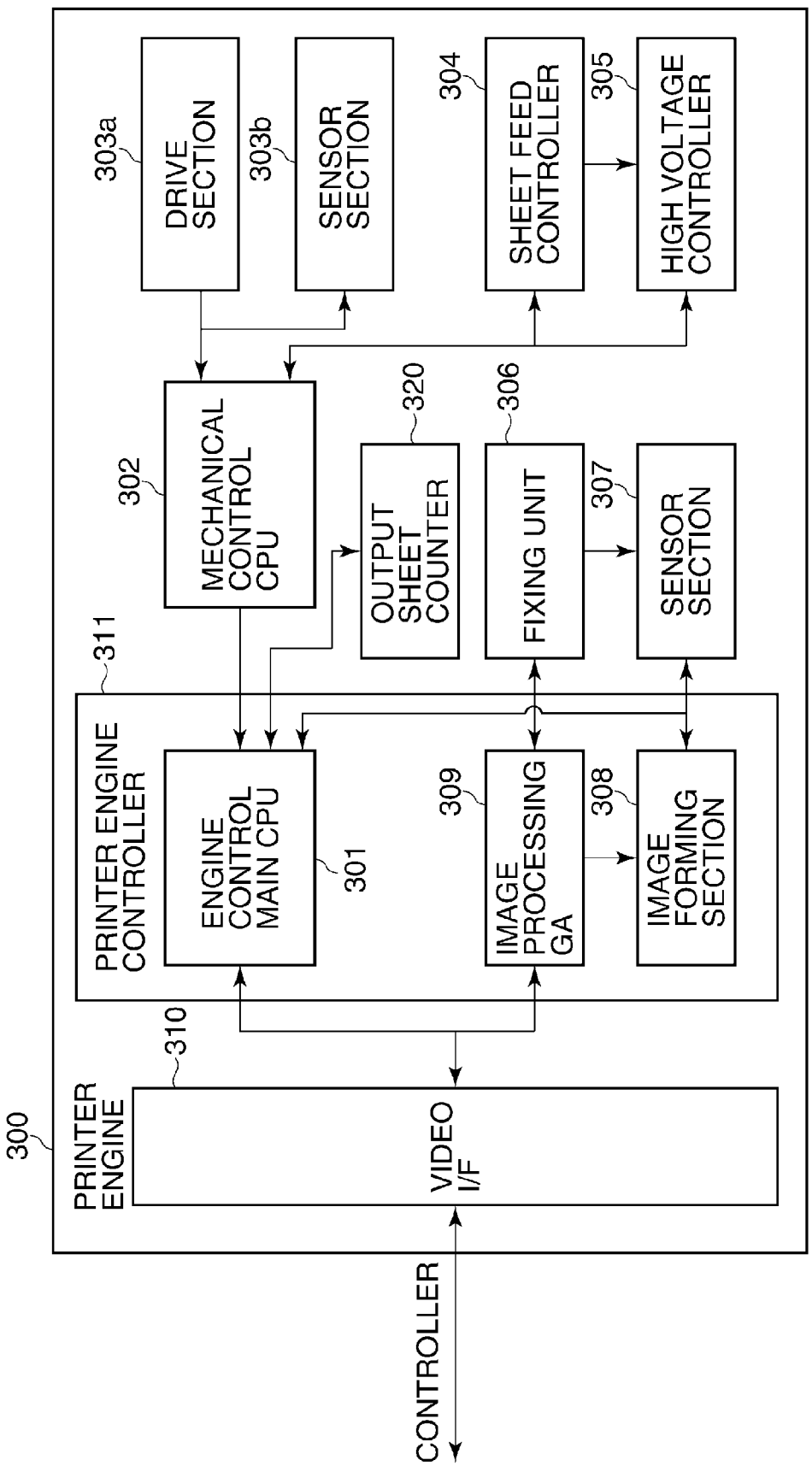
FIG. 3 is a block diagram of a control system of a printer engine appearing in FIG. 1.

FIG. 3 is a block diagram of a control system of the printer engine 300 appearing in FIG. 1.

A video interface 310 is an interface to the device interface section 112 of the controller 100 in FIG. 1. A printer engine controller 311 comprises an image processing gate array 309 for performing γ correction and the like on image data received from the video interface 310, and an image forming section 308 for outputting image by laser output, scanner motor, or the like. Further, the printer engine controller 311 includes an engine control main CPU 301 for controlling the above-mentioned components and controlling a mechanical control CPU 302 which is a sub CPU.

The printer engine 300 further includes a drive section 303a for driving a motor, a clutch, a fan, etc., not shown, a sensor section 303b for position detection and the like, a sheet feed controller 304 for controlling feed of recording sheets, and a high voltage controller 305 for charging, a fixing unit 306, a sensor section 307 for detecting temperature, humidity, and a remaining amount of toner, etc. and an output sheet counter 320.

The mechanical control CPU 302 controls the drive section 303a, the sensor section 303b, the sheet feed controller 304, and the high voltage controller 305.

Figure 4:
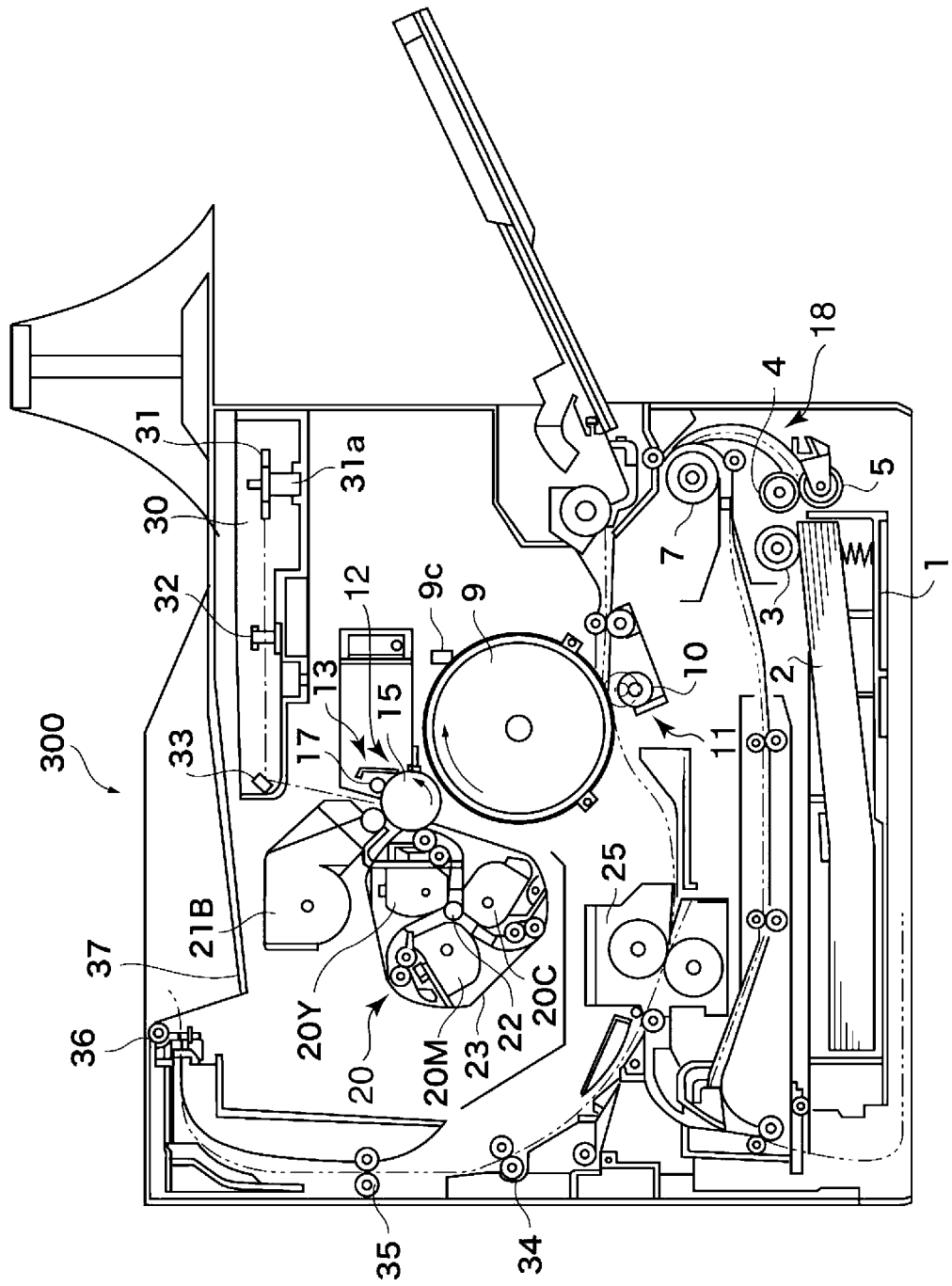
FIG. 4 is a schematic cross-sectional view of the printer engine appearing in FIG. 1.

FIG. 4 is a schematic cross-sectional view of the printer engine 300 appearing in FIG. 1.

In the digital multifunction peripheral according to the present embodiment, the printer engine 300 is configured to perform printing on sheet media by electrophotography.

The printer engine 300 forms an electrostatic latent image by scanning a photosensitive drum 15 with laser light modulated according to image data obtained on a color basis from the print data, using a polygon mirror 31. Then, the printer engine 300 develops the electrostatic latent image by toner to form a visible image. The visible images of all colors obtained by the development are sequentially multi-transferred to an intermediate transfer member 9 to form a color visible image. The color visible image is transferred onto a sheet 2, and is then fixed to the sheet 2.

The image forming section 308 that performs the above-described image formation comprises image formation-related sections, including a drum unit 13 having the photosensitive drum 15, a primary charging section having a contact charging roller 17, a cleaning section 12, a development section 20, and the intermediate transfer member 9. The image forming section 308 further comprises a feeder section 18 including a sheet cassette 1 and various kinds of rollers 3, 4, 5, and 7, a transfer section 11 including a transfer roller 10, a fixing section 25, and so forth.

Exposure of the photosensitive drum 15 is performed such that an electrostatic latent image is formed by selectively exposing a surface of the photosensitive drum 15 to laser light transmitted from a laser scanner section 30.

In the laser scanner section 30, modulated laser light is reflected by the polygon mirror 31 which is rotated by a motor 31a in synchronism with a horizontal synchronization signal of an image signal, and is thereby irradiated onto the photosensitive drum 15 via a lens 32 and a reflecting mirror 33.

To convert the above-mentioned electrostatic latent image into a visible image, the development section 20 is provided with three color development devices 20Y, 20M, and 20C, which perform development of colors of yellow (Y), magenta (M), cyan (C), respectively, and one black development device 21B which performs development of black (B).

When forming a color image, each time the intermediate transfer member 9 turns one rotation, a development rotary 23 is rotated, whereby the development processes are sequentially carried out by the yellow development device 20Y, the magenta development device 20M, the cyan development device 20C, and the black development device 21B, in the mentioned order. Therefore, as the intermediate transfer member 9 turns four rotations, the visible images are sequentially formed by toner of respective colors of yellow, magenta, cyan, and black. As a result, the full-color visible image is formed on the intermediate transfer member 9.

Then, the intermediate transfer member 9 simultaneously multi-transfers the color visible image formed on the intermediate transfer member 9 onto the sheet 2. At a location around the intermediate transfer member 9, there is disposed a density sensor 9c for detecting density of the toner image transferred to the intermediate transfer member 9. The density sensor 9c is used when creating a γLUT (gamma look-up table) for use in converting the value of an input signal such that output density characteristics are made constant with respect to the input signal, and when performing Dmax control (i.e. control for determining latent image potential according to the relationship between a result of detection by a potential sensor and the density).

The fixing section 25 fixes the transferred color visible image while conveying the sheet 2 therethrough. The sheet 2 having the visible image fixed thereon is then discharged to a discharge section 37 by discharge rollers 34, 35, and 36, followed by terminating the image forming operation.

Figure 5:
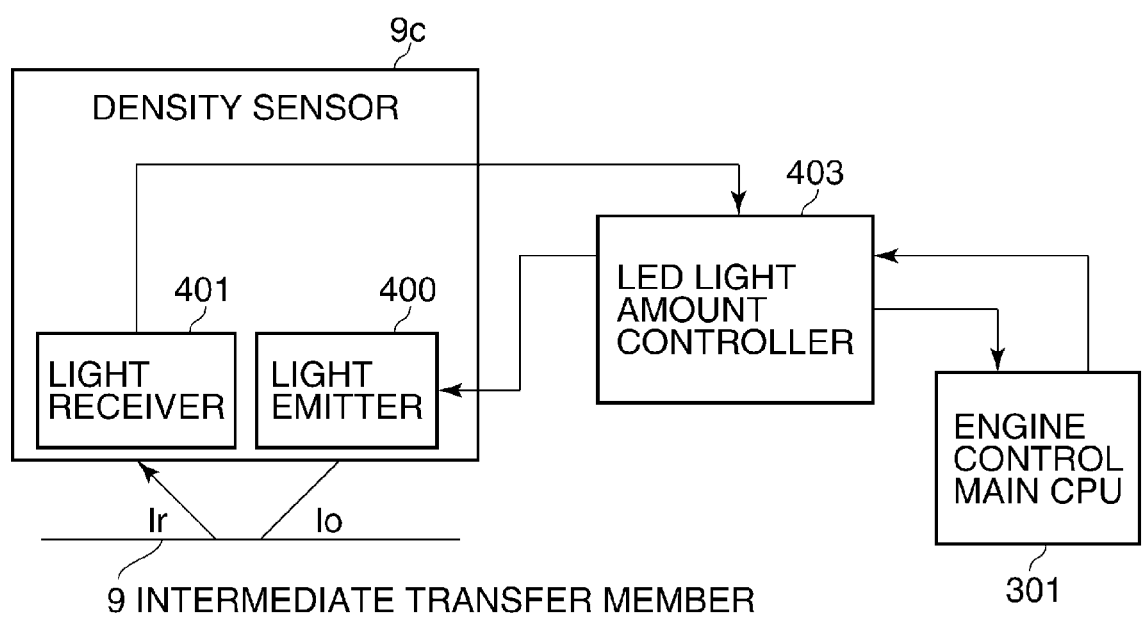
FIG. 5 is a functional block diagram of density correction control carried out by using a density sensor.

FIG. 5 is a functional block diagram of density correction control (color correction control and calibration) carried out using the density sensor 9c.

The density sensor 9c is a component of the sensor section 307 appearing in FIG. 3. The density sensor 9c comprises a light emitter 400 and a light receiver 401. Light (source light) Io emitted by the light emitter 400 is reflected on the toner (developer) on the intermediate transfer member 9, and the resulting reflected light Ir is measured by the light receiver 401. The reflected light Ir measured by the light receiver 401 is monitored by an LED light amount controller 403, and is transmitted to the engine control main CPU 301. The engine control main CPU 301 determines a toner density value by computation based on the source light Io and the measured value of the reflected light Ir.

The density sensor 9c is used for color correction control for obtaining accurate color tone of a recorded image. That is, the density sensor 9c detects densities of developer images formed on an exploratory basis on the intermediate transfer member 9 for detecting colors densities. Then, the density detection results are fed back to image forming conditions, such as an exposure amount, a development voltage, and a charging voltage, to thereby perform density control on the respective colors, so as to obtain a color image faithful to its original in a stable fashion.

The density correction control includes Dmax control and halftone control. In the Dmax control, developer images of each color are experimentally created, by varying an exposure amount, a development voltage, and a charging voltage. The densities of the developer images are measured, and then the exposure amount, the development voltage, and the charged voltage associated with a target density of each color are calculated. In the halftone control, the exposure amount, the development voltage, and the charging voltage are fixed to the values calculated in the Dmax control, and developer patch images are experimentally created in several levels by executing pseudo halftone processing, such as screening, (also called dithering, image formation patterning, or half-toning). The developer patch images are measured and returned to the controller 100. Then, the controller 100 creates the γLUT (gamma look-up table) based on the measured values. The γLUT is a table in which a relationship between an input signal and an output result is corrected such that the output result associated with the input signal shows target density characteristics.

The calibration changes exposure amounts, values of the development voltage, and values of the charging voltage, which are to be determined by the above-mentioned γLUT and the Dmax control. In a case where the calibration is completed only by the Dmax control, it is terminated in a shorter time period.

With the above-described configuration, the printer engine 300 performs correction of the densities (colors) of an image formed by the developers, in desired timing.

Next, out of processes of the controller software executed by the controller 100 of the digital multifunction peripheral of the present embodiment, an external memory medium detection-responsive calibration execution control process, which is executed when an external memory medium is inserted, will be described hereafter with reference to FIG. 6.

Figure 6:
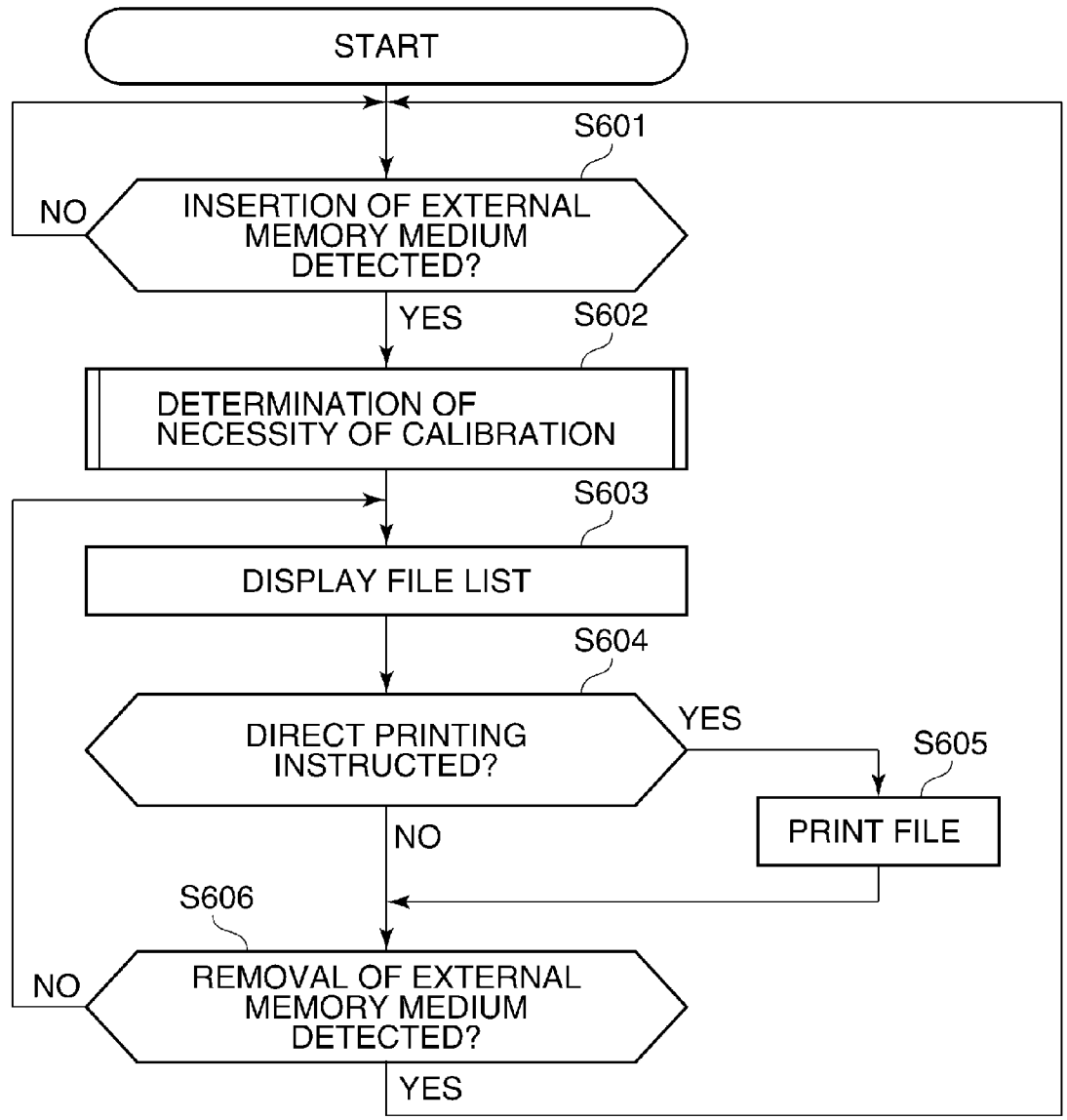
FIG. 6 is a flowchart of an external memory medium detection-responsive calibration execution control process executed by the image forming apparatus according to the first embodiment when an external memory medium is inserted therein.

FIG. 6 is a flowchart of the external memory medium detection-responsive calibration execution control process including determination of whether or not it is necessary to perform the automatic calibration, which is executed when an external memory medium is inserted therein.

First, in a step S601, the controller 100 detects whether or not an external memory medium is inserted in the memory card reader 151. If the external memory medium is not inserted, the process returns to the step S601, i.e. the step S601 is repeatedly executed. If it is determined that the external memory medium is inserted, the process proceeds to a step S602. In the step S602, the controller 100 determines whether or not it is necessary to perform automatic calibration on the printer engine 300, and the controller 100 carries out the calibration, if necessary.

Next, in a step S603, the controller 100 displays a list of files stored in the external memory medium on the operating section 150. The user can select a file to be printed out, and also select attributes associated with printing (print copy count, designation of output size, color adjustment, etc.) from the screen displaying the list. In the following step S604, the user selects whether to instruct execution of printing (direct printing).

If the user instructs execution of printing in the step S604, the controller 100 causes the file designated in the step S605 to be printed. If the user does not instruct execution of printing, the process proceeds to a step S606.

In the step S606, the controller 100 detects whether or not the external memory medium is removed from the memory card reader 151. If the external memory medium remains inserted, the process again returns to the step S603, whereas if the external memory medium is removed, the process returns to the step S601, wherein the controller 100 waits for an external memory medium to be inserted by the user.

Figure 7:
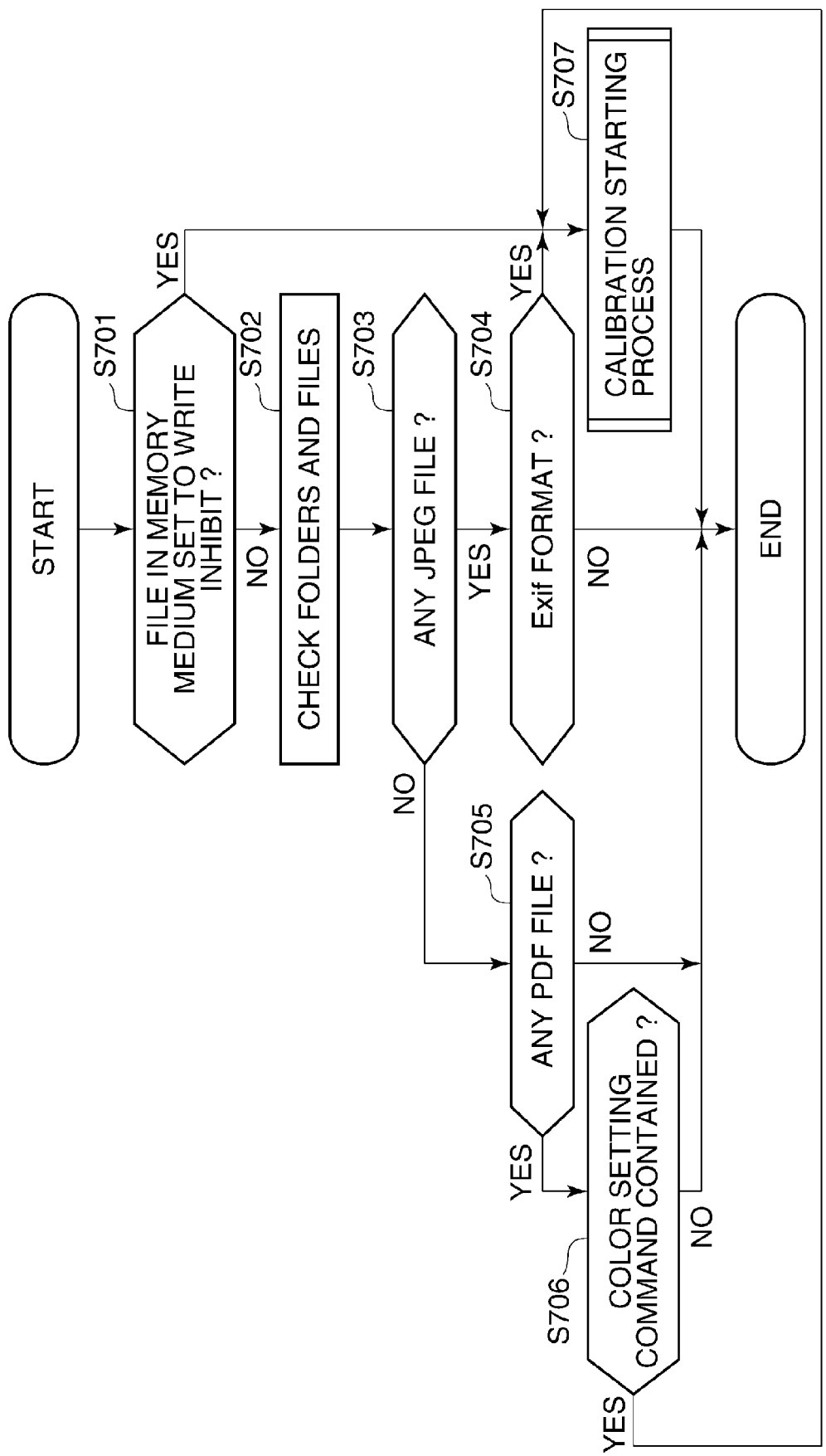
FIG. 7 is a flowchart of a process for determining whether or not it is necessary to perform the calibration, which is executed by the controller.

FIG. 7 is a flowchart of a process for determining whether or not it is necessary to perform the calibration (in the step S602 in FIG. 6), which is executed by the controller 100.

In a step S701, the controller 100 checks read/write attributes of the external memory medium inserted in the memory card reader 151, and read/write attributes of files and folders in the external memory medium. Then, the controller 100 checks whether or not the storage medium, all files, or all folders are set to "write inhibit", i.e. "read only" (third condition). If they are set to "read only", the controller 100 performs a calibration starting process in a step S707. This is because it is considered that when the external memory medium is inserted into the image forming apparatus, if the external memory medium is set to "read only", it often occurs that a file in the mounted external memory medium is going to be printed, and hence such calibration execution control as mentioned above is performed.

If it is determined in the step S701 that there is any file or folder which is not set to "write inhibit", the process proceeds to a step S702. In the step S702, the controller 100 checks the file types of all files stored in the external memory medium. The "file types" mentioned here are those each of which can be identified from an extension of a file name. For example, it is assumed that an image file compressed by JPEG format has an extension "*.JPG" or "*.JPEG", and a PDF document file has the extension "*.PDF". In the step S702, it is not necessarily required to check the file types of all files in the external memory medium. For example, it is only necessary to check whether or not there is a JPEG image file or a PDF image file. Further, in the step S702, file types to be checked may be other than a JPEG file and a PDF document file. That is, it is only necessary to check whether or not there is a file of a type which can be printed out by the image forming apparatus. For example, if the image forming apparatus is capable of printing a file in TIFF format in addition to JPEG and PDF formats, it may be checked whether or not there are any files of the three types of JPGE, PDF, and TIFF.

In a step S703, the controller 100 determines whether or not there is a JPEG file in the external memory medium. If there is a JPEG file, the process proceeds to a step S704, wherein the JPEG file in the external memory medium is analyzed and it is determined whether or not the file is Exif-compliant. In general, JPEG files are written according to a format defined by ISO/IEC 10918-1. Some JPEG files are compliant with the Exif standard which defines an image file format for digital still cameras. The JPEG files compliant with the Exif standard conform to JPEG Baseline DCT format specified by ISO/IEC 10918-1, into which an application marker segment is inserted. FIG. 8 is a diagram of the basic structure of an Exif-compliant JPEG file. If APP1 in FIG. 8 contains an Exif identification code (additional information), the JPEG file can be determined to be Exif-compliant.

Returning again to FIG. 7, if it is determined in the step S704 that the JPEG file is not Exif-compliant, the controller 100 terminates the process without executing the calibration. If it is determined in the step S704 that the JPEG file is Exif-compliant, the process proceeds to the step S707, wherein the calibration starting process is executed. It is supposed that an Exif-compliant file is a picture image captured by an image pickup apparatus, such as a digital still camera or a video camera, and hence often requires an exact color reproduction. Therefore, the calibration execution control is performed by determining whether or not the file is Exif-compliant.

If it is determined in the step S703 that there is no JPEG file in the external memory medium, the controller 100 determines in a step S705 whether or not there is a PDF file in the external memory medium. If it is determined in the step S705 that there is no PDF file, the controller 100 terminates the present process without executing the calibration. If it is determined in the step S705 that there is a PDF file, the controller 100 analyzes the PDF file in the external memory medium in a step S706.

In the step S706, it is not necessary to analyze the entire PDF file, but the analysis is performed only for determining whether or not the PDF file contains a color-setting operator (color specification command). The color-setting operator, i.e. an operator which sets colors of PDF includes "cs", "CS", "sc", "scn", "SC", "SCN", and so forth.

If it is determined that such a color-setting operator is contained, the process proceeds to the step S707, wherein the controller 100 performs the calibration starting process. In the step S706, if it is determined that no color-setting operator is contained, the process is terminated without executing the calibration. If any color-setting operator is contained in the PDF file, an exact color space expression, typified by ICC based color space, is sometimes performed, and hence the calibration execution control is performed by determining whether the file contains any color-setting operator.

Figure 9:
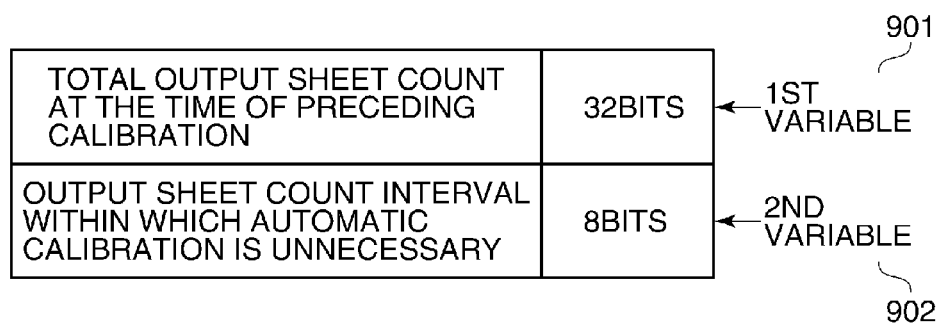
FIG. 9 is a diagram useful in explaining calibration requirement-setting information used by the image forming apparatus according to the first embodiment.

FIG. 9 is a diagram useful in explaining calibration requirement-setting information used by the image forming apparatus according to the first embodiment.

This setting information, which is stored in the RAM 102, records conditions for determining whether or not it is necessary to perform the calibration, and includes a 32-bit counter which is a first variable 901. This counter is used for storing a total output sheet count of sheets printed by the printer engine 300 (total count of image-formed sheets) when the preceding calibration was performed on a preceding occasion.

When the digital multifunction peripheral is powered on, the current value of the output sheet counter 320 in the printer engine 300 is acquired by the controller 100 via the device interface section 112, and is stored as the first variable 901. Further, the setting information includes an 8-bit counter which is a second variable 902. This counter determines an interval (difference) between one total output sheet count to another total output sheet count, i.e. an output sheet count interval, during which it is not necessary to perform automatic calibration during execution of the calibration execution control. Although the image forming apparatus according to the present embodiment has the function of automatically executing the calibration every predetermined count of printed sheets, the second variable 902 in FIG. 9 is set to a smaller value than the above-mentioned predetermined count of printed sheets.

Although the second variable 902 is stored in the RAM 102, an initial value thereof stored in the ROM 103 is read out when the digital multifunction peripheral is powered on, and is copied into the RAM 102. Further, it is also possible to change the setting of the second variable 902 as one of user configuration items from the operating section 150.

Figure 10:
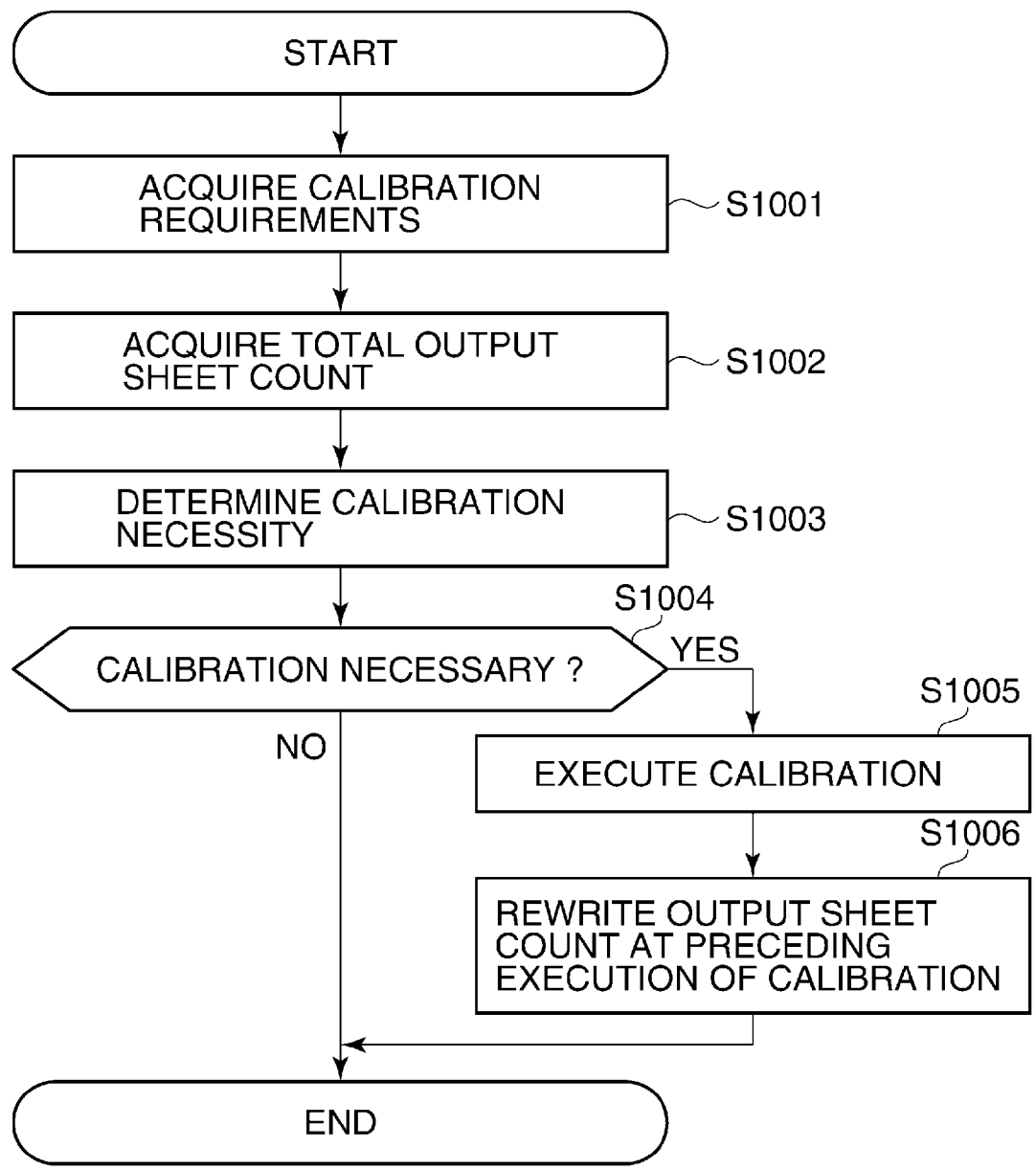
FIG. 10 is a flowchart of a calibration starting process executed by the image forming apparatus according to the first embodiment.

FIG. 10 is a flowchart of the calibration starting process (step S707 in FIG. 7) according to the first embodiment.

First, in a step S1001, the controller 100 acquires values of the calibration requirement-setting information. Next, in a step S1002, the current value of the output sheet counter 320 in the printer engine 300 is acquired via the device interface section 112. In a step S1003, the controller 100 determines whether or not it is necessary to perform the calibration. The determination is performed according to the following two criteria:

$$CN-M1>M2 \qquad \text{Criterion 1:}$$

wherein CN represents the current value of the output sheet counter 320 of the printer engine 300, M1 represents the value of the first variable 901 (total output sheet count of sheets printed by the printer engine 300 when the calibration was carried out on a preceding occasion: see FIG. 9), and M2 represents the value of the second variable 902 (the aforementioned output sheet count interval within which it is not necessary to perform automatic calibration: see FIG. 9).

Criterion 2:

The external memory medium stores a file of which the file type is Exif-compliant JPEG (first condition) or PDF containing a color setting command (second condition). These conditions were checked in the earlier steps S703 to S706 described with reference to FIG. 7 and the result of those checks are used in the current step S1003 to determine the necessity of calibration.

If both of the above-mentioned two criteria are satisfied, the controller 100 determines in a step S1004 that it is necessary to perform the calibration, and instructs the printer engine 300 to perform the calibration in a step S1005. Further, in a step S1006, the controller 100 rewrites the value of the first variable 901 in FIG. 9 into the current value of the output sheet counter 320 of the printer engine 300.

On the other hand, if any one of the above-mentioned criteria is not satisfied, it is determined in the step S1004 that it is not necessary to perform the calibration. That is, if it is determined with reference to the above-mentioned criterion 1 that the count of image-formed sheets after execution of the preceding calibration is not more than the predetermined number, the calibration is not performed. Further, if it is determined with reference to the above-mentioned criterion 2 that the file type is neither Exif-compliant JPEG nor PDF containing a color setting command, the calibration is not performed.

When an image or a document in the external memory medium is printed, if a highly accurate color reproduction is demanded, the calibration may be performed if the condition of the criterion 2 is satisfied, regardless of the result of determination with reference to the criterion 1.

When a print job for printing a JPEG file (e.g. image data captured by a digital camera) or a PDF file in which color conversion is specified is performed, a highly accurate color reproduction is demanded. When executing such a print job using the memory direct printing function, it is necessary for the user to perform operations according to the following procedure:

(1) insert an external memory medium into the memory card reader 151 (step S601)
(2) select a file to be printed (step S603)
(3) select attributes on printing (step S604)
(4) instruct to print the file (step S605)

It takes a certain time period (in general, several seconds or several tens of seconds) for the user to perform the above-mentioned operations. In the present embodiment, by making use of the time period taken for the user to perform the operations, the calibration is automatically performed in the background. Therefore, it is possible to start the calibration before the user instructs to perform printing of image data or document data in the external memory medium.

That is, if it is detected that the external memory medium is inserted into the memory card reader 151, a data file in the external memory medium is read to check storage medium information, folder information, and file information, and if predetermined conditions are satisfied, the calibration is automatically started. In the present embodiment, for example, the predetermined conditions are as follows: the printer engine 300 is in a state requiring the calibration (criterion 1), and a file in the external memory medium requires the calibration (criterion 2). Then, if the predetermined conditions which make the calibration necessary are satisfied, the calibration is promptly and automatically executed.

With this calibration execution control, the user who inserts an external memory medium into the memory card reader 151 to prints a file in the external memory medium, and thus a printout accurate in color reproduction can be obtained, and it is possible to reduce a waiting time for printing.

Next, an image forming apparatus according to a second embodiment of the present invention will be described with reference to FIGS. 11 and 12. The description of the second embodiment is mainly given of different points from the first embodiment, and the same component elements as those in the first embodiment are denoted by the same reference numerals while omitting the description thereof. In the first embodiment, whether or not it is necessary to perform the calibration is determined only according to the criterion 1 and the criterion 2. Under these conditions, it is possible for the user to obtain printed products of which the colors are accurately reproduced in a short waiting time period. However, there is a case where other benefits are desired even at the cost of some accuracy of color reproduction.

One of the other benefits includes power saving by setting an electric power saving mode. In the first embodiment, if it is determined that it is necessary to perform the calibration, the calibration is necessarily carried out. However, the operation of the calibration itself consumes electric power in driving the engine. Therefore, a user who attaches importance to electric power saving sometimes desires not to execute the automatic calibration.

Further, some types of printer engines have a plurality of modes of calibration operation. To perform the calibration in a short time period while securing a certain degree of color reproducibility, a mode executing only Dmax control is suitable. Hereafter, this mode is referred to as the "quick correction mode". That is, this is an example of a simplified correction mode in which the calibration can be performed in a first processing time period.

On the other hand, to realize as accurate color reproduction as possible, a mode is preferable in which after executing the Dmax control, halftone control is performed to create a γLUT. By executing the halftone control, halftone density accuracy is improved. However, in this mode, the calibration operation becomes complicated due to creation of the γLUT, and hence it takes a longer time period to complete the calibration. Hereafter, this mode is referred to as the "full correction mode". That is, this is an example of a complete correction mode in which it takes a longer time period to complete the calibration than the first processing time period.

If the printer engine has the above-mentioned two modes, it is possible to use both of them by switching between them. For some users who attach importance to electric power saving or desire to reduce waiting time before completion of the calibration at the cost of some accuracy of color reproduction, it is not necessary to perform the calibration in the full correction mode, but it is enough to perform the calibration only in the quick correction mode.

The second embodiment of the present invention meets the above-mentioned needs by users who want to select the above-mentioned quick correction mode.

FIG. 11 is a diagram showing calibration requirement-setting information used by an image forming apparatus according to the second embodiment of the present invention. The setting information differs from the setting information in the first embodiment described with reference to FIG. 9 in that a third variable 1101 and a fourth variable 1102 are additionally provided. The third variable 1101 is for storing a setting concerning whether or not to inhibit automatic calibration. This setting itself can be set as one of user configuration items from the operating section 150.

The fourth variable 1102 is for storing a setting concerning selection between the modes of the calibration operation. If this variable is equal to 0, the calibration operation is set to the "quick correction mode" in which the calibration is completed only by Dmax control in a short time period. If the variable is equal to 1, the calibration operation is set to the "full correction mode" in which the Dmax control and the halftone control are performed, and hence it takes a longer time period to complete the calibration than in the "quick correction mode", but it is possible to realize accurate color reproduction.

Figure 12:
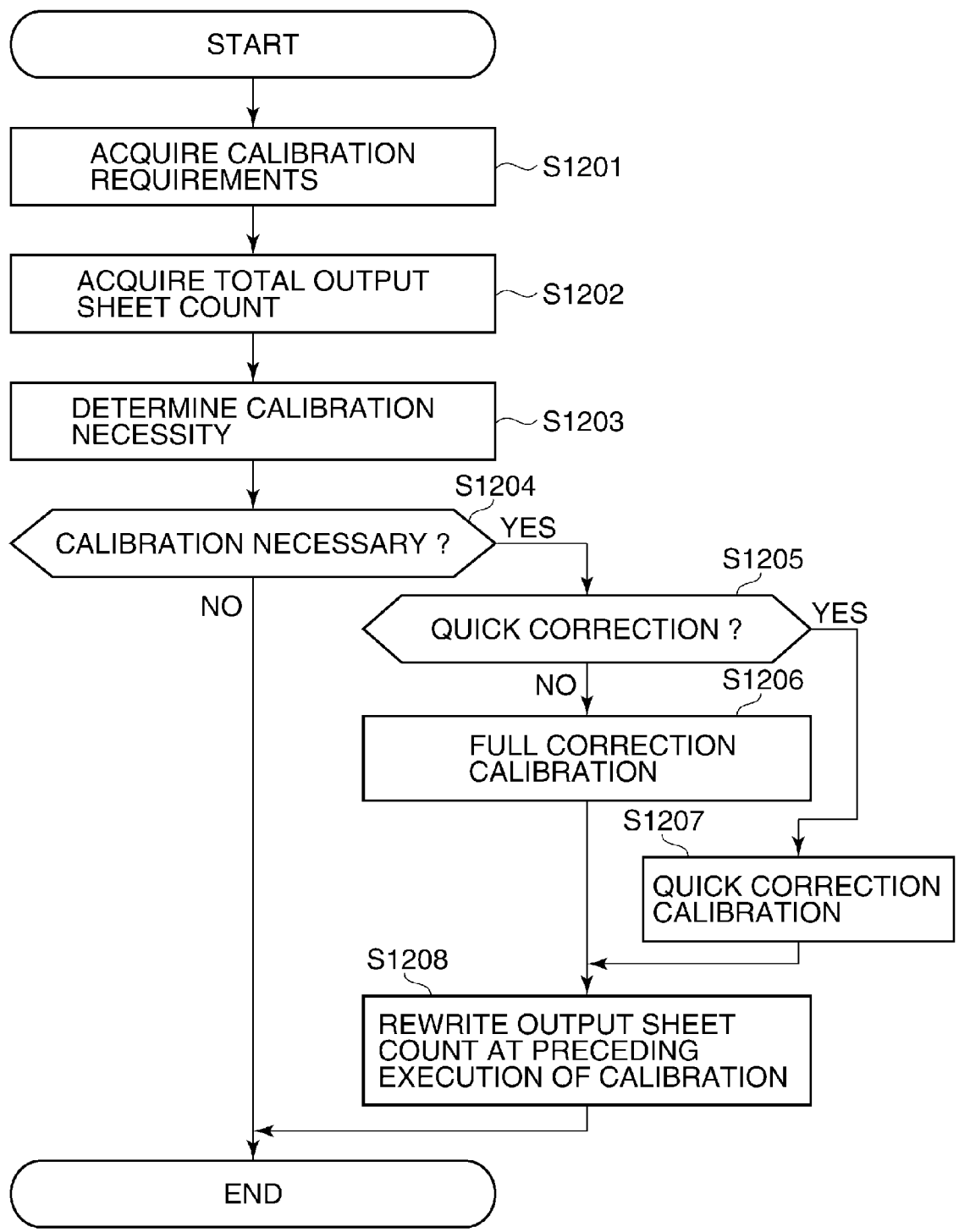
FIG. 12 is a flowchart of a calibration starting process executed by the image forming apparatus according to the second embodiment.

FIG. 12 is a flowchart of a calibration starting process (step S707 in FIG. 7) executed by the image forming apparatus according to the second embodiment.

First, in a step S1201, the controller 100 acquires the values of the calibration requirement-setting information illustrated in FIG. 11. Next, in a step S1202, the controller 100 acquires the current value of the output sheet counter 320 of the printer engine 300, and then in a step S1203, the controller 100 determines whether or not it is necessary to perform the calibration. The determination is performed according to the following three criteria:

The criterion 1 and the criterion 2 are the same as those described for the first embodiment with reference to FIG. 9, and the criterion 3 is that the value of the third variable 1101 is equal to 0 (the automatic calibration is not inhibited).

If all of the above-mentioned three criteria are satisfied, the controller 100 determines in a step S1204 that it is necessary to perform the calibration. Next, in a step S1205, the fourth variable 1102 in FIG. 11 is checked, whereby it is determined whether the calibration operation is set to the "quick correction mode" or the "full correction mode". If the fourth variable 1102 is equal to 0, it is determined that the calibration operation is set to the quick correction mode. If the fourth variable 1102 is equal to 1, it is determined that the calibration operation is not set to the quick correction mode but to the full correction mode. In the case of the quick correction mode, the controller 100 instructs the printer engine 300 to perform quick correction calibration in a step S1207. In the case of the full correction mode, the controller 100 instructs the printer engine 300 to perform full correction calibration in a step S1206.

Further, in a step S1208, the controller 100 rewrites the value of the first variable 901 in FIG. 11 into the current value of the output sheet counter 320 in the printer engine 300, followed by terminating the present process. On the other hand, if it is determined in the step S1203 that any one of the above-mentioned criteria is not satisfied, it is determined in the step S1204 that it is not necessary to perform the calibration, followed by terminating the present process.

According to the second embodiment, it is possible to obtain the same advantageous effects as provided by the above-described first embodiment, and further, it is possible to properly meet the user's needs to select the quick correction mode to complete the calibration in a short time period even at the cost of some accuracy of color reproduction.

Next, an image forming apparatus according to a third embodiment of the present invention will be described with reference to FIG. 13. The description of the third embodiment is mainly given of different points from the first and second embodiments, and the same component elements as those in the first embodiment are denoted by the same reference numerals while omitting the description thereof. In the first and second embodiments, the description has been given of the digital multifunction peripheral used for both of photographic printing and office document printing. In the third embodiment, the description will be given of a method of applying the present invention to a digital multifunction peripheral which frequently uses image data captured by digital cameras.

The memory card reader 151 is capable of recognizing the slot for a USB mass storage device and the group of a plurality of slots for various kinds of memory cards, as serial buses of two different channels. This makes it possible to distinguish whether a connected external memory medium is a USB mass storage device (e.g. a USB memory) or one of the various kinds of memory cards.

Figure 13:
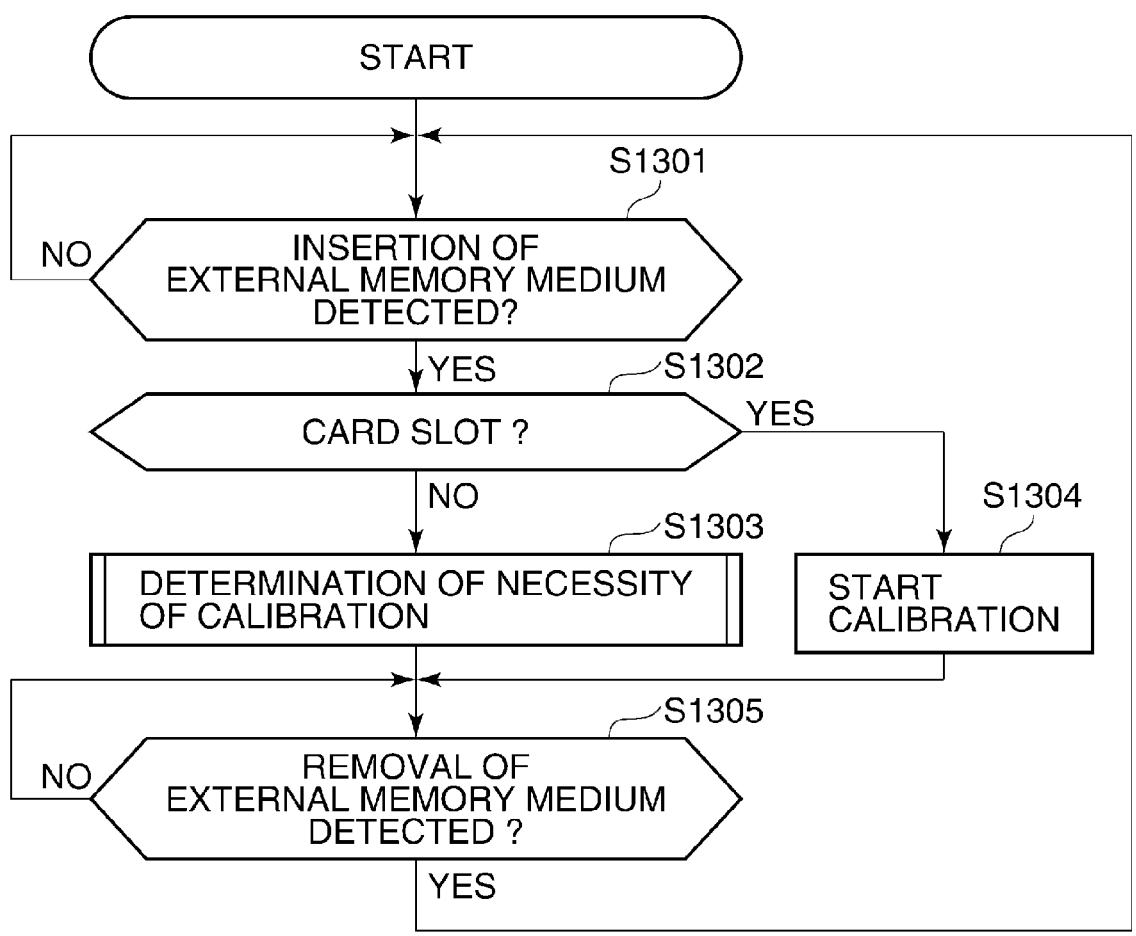
FIG. 13 is a flowchart of an external memory medium detection-responsive calibration execution control process executed by an image forming apparatus according to a third embodiment of the present invention when an external memory medium is inserted therein.

FIG. 13 is a flowchart of an external memory medium detection-responsive calibration execution control process which is executed by the image forming apparatus according to the third embodiment when an external memory medium is inserted.

First, in a step S1301, the controller 100 detects whether or not an external memory medium is inserted into the memory card reader 151. If an external memory medium is not inserted, the process returns to the step S1301.

If it is determined in the step S1301 that an external memory medium is inserted, the process proceeds to a step S1302. In the step S1302, the controller 100 determines whether the above-mentioned connected external memory medium is a USB mass storage device or one of the various kinds of memory cards.

If it is determined in the step S1302 that the connected external memory medium is a USB mass storage device, the controller 100 determines in a step S1303 whether or not it is necessary to perform the calibration of the printer engine 300, and performs the calibration, if necessary. The determination whether or not it is necessary to perform the calibration is executed in the same manner as described for the first embodiment with reference to FIG. 10 or as described for the second embodiment with reference to FIG. 12.

If it is determined in the step S1302 that the connected external memory medium is one of the various kinds of memory cards, it is presumed that images captured by digital cameras are stored in the external memory medium. Then, the controller 100 immediately executes the calibration operation in a step S1304. This is for the following reason: Whichever of a USB mass storage device or one of the various kinds of memory cards the connected external memory medium may be, it can store any types of files. However, the various kinds of memory cards have been widely used as memory media for storing images captured by digital cameras, and hence captured images are often recorded in memory cards directly mounted in respective digital cameras. On the other hand, there are very few digital cameras in which a USB mass storage device can be directly mounted. From the above, there is a higher possibility that the various kinds of memory cards store images captured by digital cameras.

Following the step S1303 or S1304, in a step S1305, the controller 100 detects whether or not the external memory medium is removed from the memory card reader 151. If the external memory medium remains inserted, the step S1305 is repeatedly executed whereby the controller 100 waits for the external memory medium to be removed by the user. If it is detected that the external memory medium is removed, the process returns to the step S1301, wherein the controller 100 waits for an external memory medium to be inserted by the user.

According to the third embodiment, it is possible to obtain the same advantageous effects as provided by the above-described first and second embodiments, and further, if there is a high possibility that the images stored in the external memory medium are those captured by a digital camera, which demand a high accuracy of color reproduction, it becomes possible to immediately start the calibration operation.

In the third embodiment, the calibration is selective in the case of a USB mass storage device but automatic (non-selective) in the case of a memory card. In another aspect of the present invention, the calibration of the image forming apparatus can be started automatically when it is detected that a memory card is connected to or mounted in the apparatus, even if the apparatus is not capable of having a USB mass storage device connected thereto or mounted therein. In yet another aspect of the invention, an image forming apparatus is capable of being connected to or mounting first and second different types of external memory media. Calibration is started automatically when a memory medium of the first type is connected or mounted. In contrast, calibration is started selectively when a memory medium of the second type is connected or mounted. The selection criteria are not limited to being based on a result of determining attributes of the stored data or an attribute of the memory medium as in the third embodiment. For example, the determination could be based on a time elapsed since the last calibration or on environmental conditions (e.g. a rise in humidity). The first type of memory medium may be a memory medium likely to store images captured by a digital camera (e.g. a memory card) and the second type of memory medium may be a memory medium less likely than the first type of memory medium to store images captured by a digital camera (e.g. a USB mass storage device).

Next, an image forming apparatus according to a fourth embodiment of the present invention will be described with reference to FIG. 14. The description of the fourth embodiment is mainly given of different points from the first to third embodiments, and the same component elements as those in the first embodiment are denoted by the same reference numerals while omitting the description thereof. In the above-described first, second and third embodiments, the description has been given of the digital multifunction peripheral mainly used for printing. In the fourth embodiment, the description will be given of a method of applying the present invention to a digital multifunction peripheral which frequently uses a function for storing image data obtained by a scan function into an external memory medium as a file.

Figure 14:
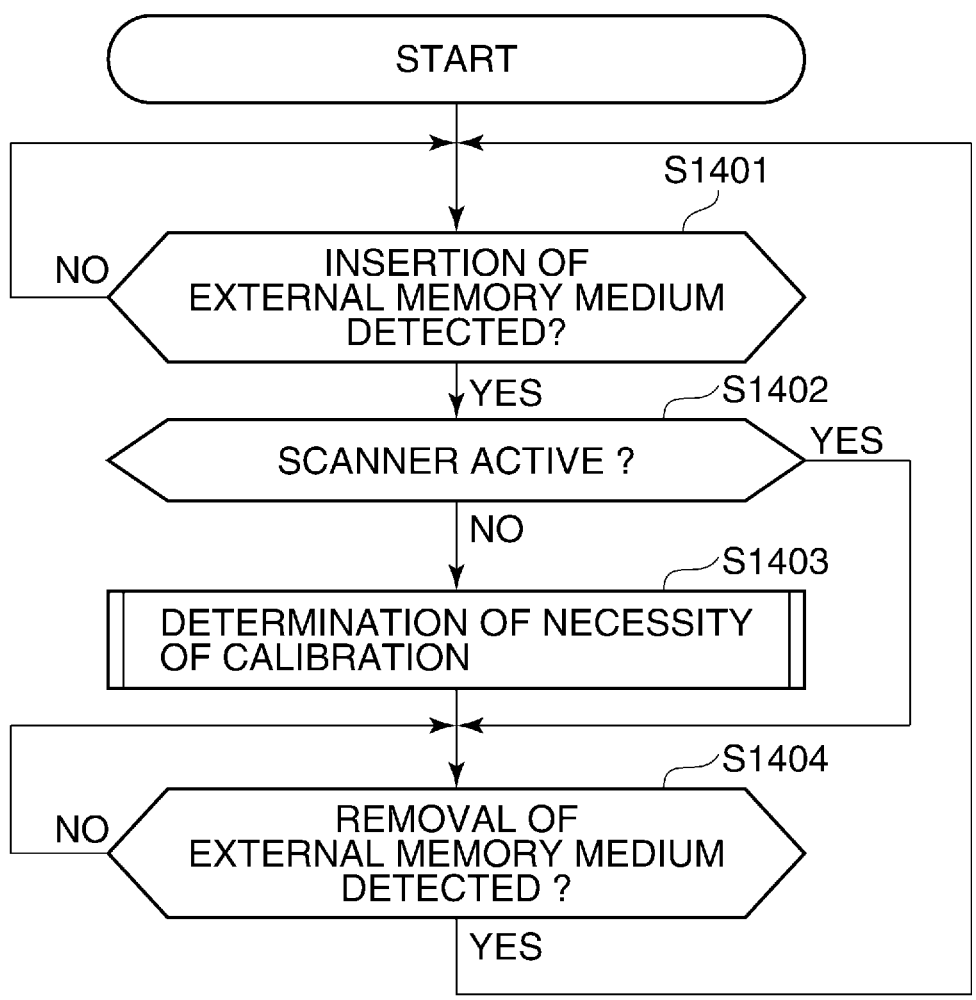
FIG. 14 is a flowchart of an external memory medium detection-responsive calibration execution control process executed by an image forming apparatus according to a fourth embodiment of the present invention when an external memory medium is inserted therein.

FIG. 14 is a flowchart of an external memory medium detection-responsive calibration execution control process which is executed by an image forming apparatus according to the fourth embodiment when an external memory medium is inserted therein.

First, in a step S1401, the controller 100 detects whether or not an external memory medium is inserted into the memory card reader 151. If an external memory medium is not inserted, the process returns to the step S1401, i.e. the step S1401 is repeatedly executed. If it is determined that an external memory medium is inserted, the process proceeds to a step S1402.

In the step S1402, the controller 100 determines whether or not the scanner 190 is active. The scanner 190 is controlled by another program different from that for the controller 100, and always performs automatic detection of an original to be scanned in. When an original is placed on an original platen glass, the scanner 190 rapidly detects that, and activates a status register of the scanner 190.

If it is determined that the scanner 190 is active, it is considered that the user intends not to print data in the external memory medium, but to store image data scanned by the scanner 190 into the external memory medium.

In this case, to omit the calibration operation, instead of the controller 100 executing the process for determining whether or not it is necessary to perform the calibration in a step S1403, the process proceeds to a step S1404. If the scanner 190 is not active, it is considered that the user intends to print data in the external memory medium.

In this case, in the step S1403, the controller 100 determines whether or not it is necessary to perform the calibration of the printer engine 300, and executes the calibration, if necessary. The determination whether or not it is necessary to perform the calibration is executed in the same manner as described for the first embodiment with reference to FIG. 10 or as described for the second embodiment with reference to FIG. 12.

Following the step S1402 or S1403, in the step S1404, the controller 100 detects whether or not the external memory medium is removed from the memory card reader 151. If the external memory medium remains inserted, the step S1404 is repeatedly executed whereby the controller 100 waits for the external memory medium to be removed by the user. If it is detected that the external memory medium is removed, the process returns to the step S1401, wherein the controller 100 waits for an external memory medium to be inserted by the user.

According to the fourth embodiment, in the digital multifunction peripheral which frequently uses the function for storing image data scanned by the scanner 190 into an external memory medium as a file, it is possible to prevent the calibration from being uselessly executed. Further, it is also possible to obtain the same advantageous effects as provided by the above-described first, second, and third embodiments.

In the preceding embodiments, insertion of an external memory medium into the memory card reader 151 is detected as an "pre-print" event indicating that a print instruction is likely to be received. This makes it possible to start the calibration before the user instructs to perform printing of image data or document data in the external memory medium. However, the insertion of an external memory medium is just one example of such a pre-print event indicating that a print instruction is likely to be received. In other situations, it is possible to detect from the use of a document or file that a print instruction is likely to be received. It is also possible to detect from a log in by a user at a printer that a print instruction is likely to be received. In these situations, too, following the detected pre-print event (use of the document or file or log in) the user often has to perform one or more operations (e.g. to select a file to be printed; to select or modify attributes on printing) before giving an instruction to print the file. It takes a certain time (several seconds or tens of seconds) for the user to perform these operations. By making use of the time period taken for the user to perform these operations, the calibration can be performed automatically in the background before the user makes the print instruction.

Figure 15:
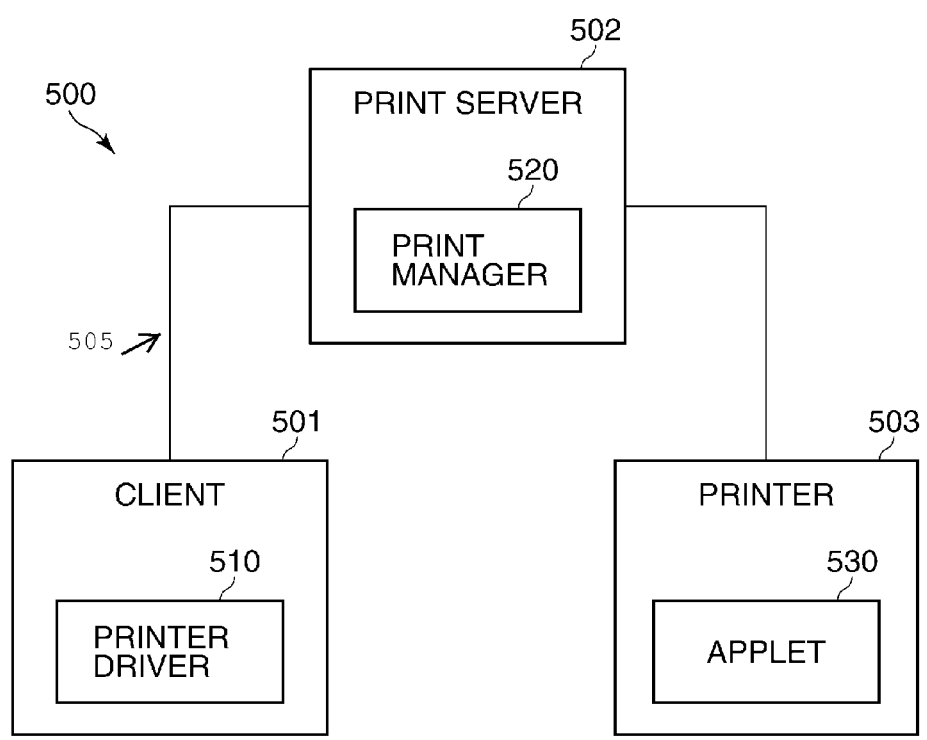
FIG. 15 is a block diagram of a printing system according to a fifth embodiment of the present invention.

Next, a fifth embodiment will be described in which the present invention is applied to so-called secure printing system. FIG. 15 shows a secure printing system 500 including a client 501, a print server 502, and a printer 503 connected to each other over a LAN 505. The client 501 is a standard Windows® based PC, the server 502 is a standard Windows® based server, and the printer 503 is a commercially available printer, such as those manufactured by Canon, HP etc. The printer 503 could be an MFP according to any one of the preceding embodiments. Although not shown in FIG. 15, there are several other printers connected to the LAN 505. Detailed description of these printers is unnecessary for understanding of the present embodiment. Further details of this type of secure printing system can be found in patent publication US 2009/0168100.

A printer driver 510 is installed on the client 501, and a print-job distribution program (print manager 520) is installed on the print server 502. A printer program (applet 530) is installed on the printer 503. The print manager 520 is a software application for managing print jobs and has a remote network interface to allow the print manager 520 to be controlled from the client 501.

Figure 16:
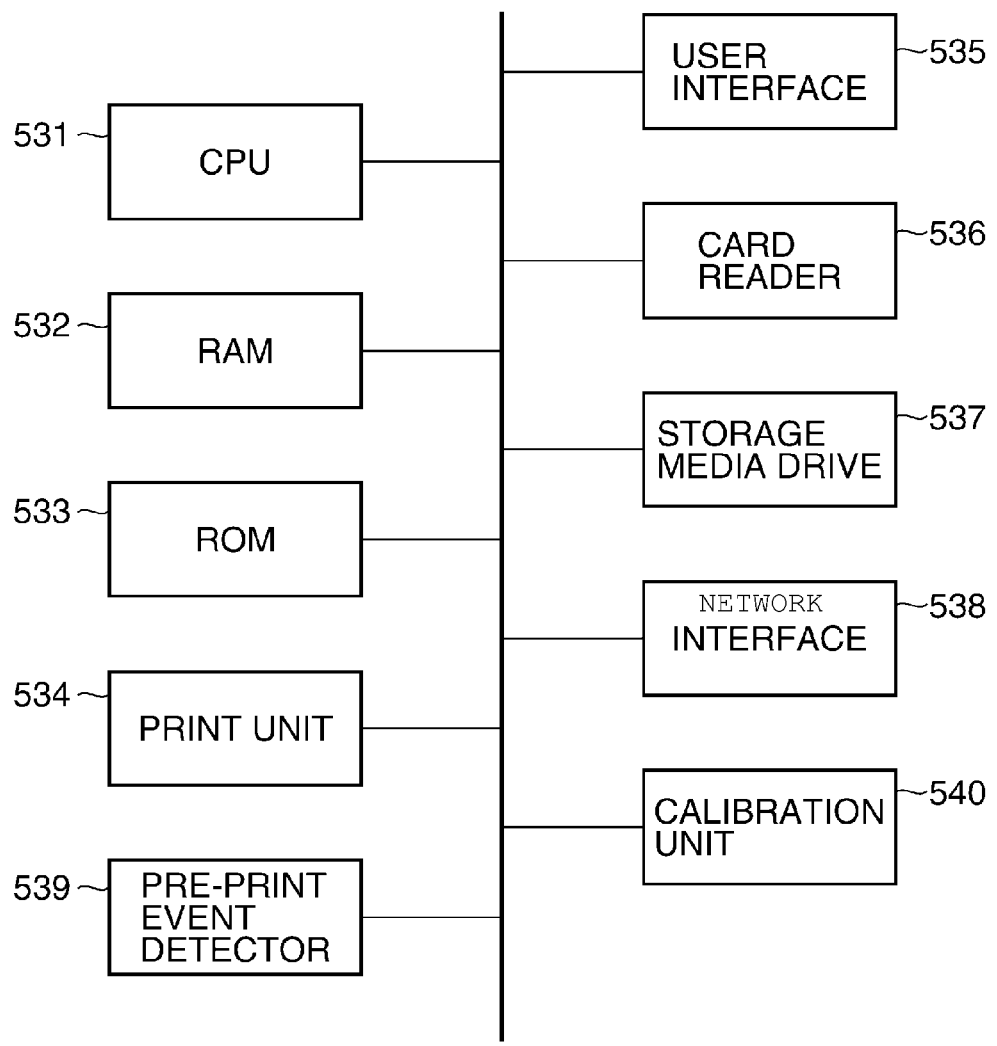
FIG. 16 is a block diagram showing parts of a print server in the printing system of FIG. 15.

FIG. 16 shows parts of the printer 503. The printer 503 includes a CPU 531, RAM 532, ROM 533, a print unit 534, a user interface 535, a card reader 536, a storage media drive 537, a network interface 538, a pre-print event detector 539 and a calibration unit 540.

The CPU 531 and RAM 532 are standard components that perform their usual functions. The ROM 533 stores software for the printer, such as a printer operating system. The print unit 534 represents components of the printer for printing documents. The user interface 535 is provided to allow entry of settings and display of settings to a user. In this embodiment, the user interface 535 is formed of a series of user operable buttons (hard keys) and a touch-screen display for entry of settings (soft keys). The card reader 536 is an identity-card reader, which uses RFID technology. The storage media drive 537 stores the applet 530. In use, the applet 530 may be run using the CPU 531 and RAM 532 in order to perform steps described below in connection with FIG. 17. The network interface 538 is a set of components that allows the printer 503 to communicate over the LAN 505. The pre-print event detector 539 detects a pre-print event indicating that a print instruction is likely to be received at the printer 503. The calibration unit 540 causes the printer 503 to start a calibration operation, in response to detection of the pre-print event by the detector 539, before such a print instruction is received.

The operation of the printing system will now be explained with reference to FIGS. 17 and 18.

Figure 17:
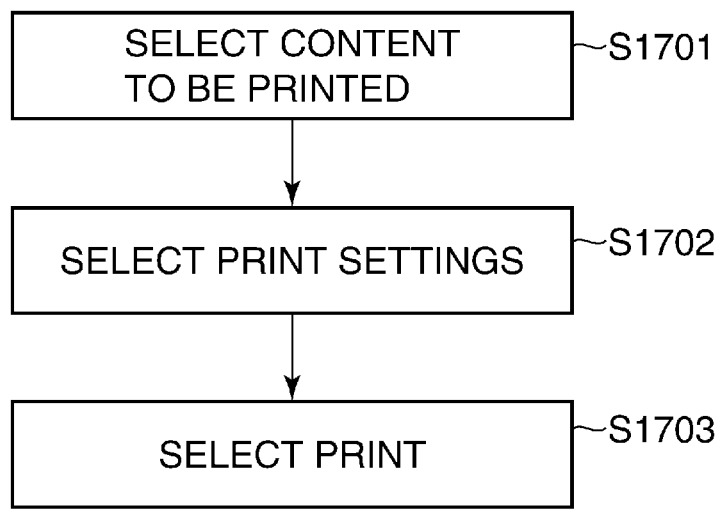
FIG. 17 is a flowchart for use in explaining operation of the printing system of FIG. 15 when a user creates a print job at a client apparatus.
Figure 18:
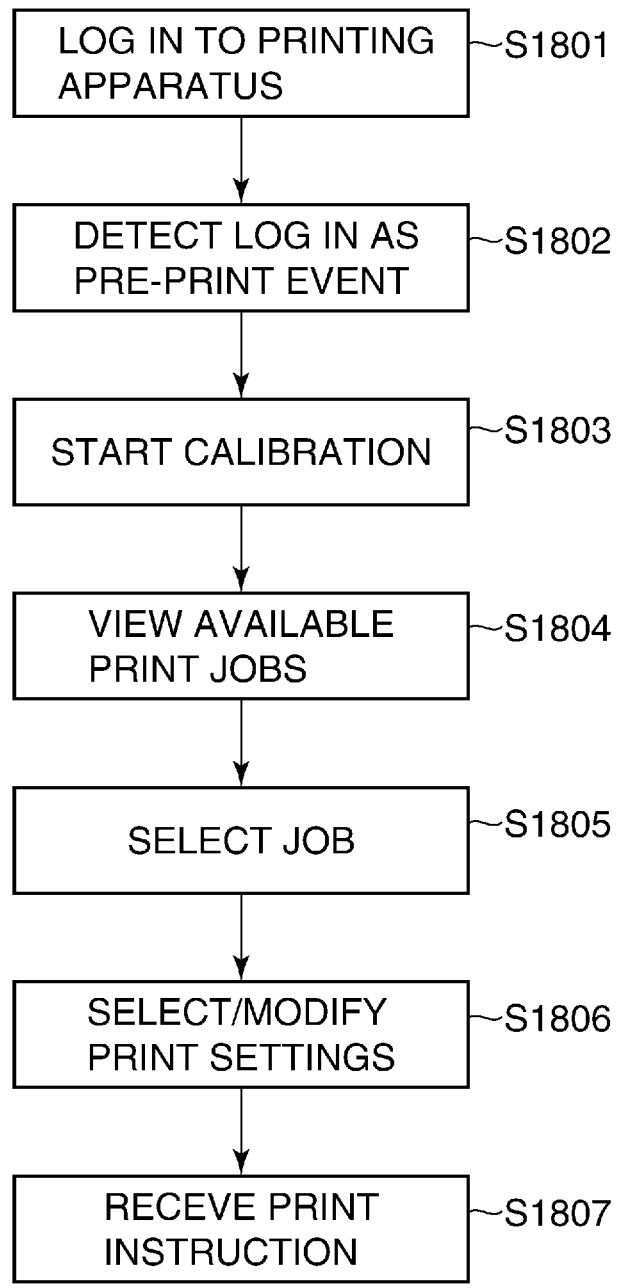
FIG. 18 is a flowchart for use in explaining operation of the printing system of FIG. 15 when a user retrieves a print job at a printing apparatus.

FIG. 17 shows operations of a user when sending a document for printing. In this example, it is assumed that the user has produced a document using a word-processing application, and, in a step S1701, the user selects a print option from the word-processing application. The word-processing application provides a screen to allow a user to select the parts of the document to be printed. Once the user has selected the parts of the document to be printed, in a step S1702, the printer driver 510 is launched. When the printer driver 510 is launched, the printer driver uses the network interface 519 of the client 501 to connect to the print manager 520 on the server 502. When a connection has been established, the printer driver 510 receives and displays a remote network interface of the print manager 520. The remote network interface of the print manager 520 permits entry of print settings. The print settings include selection of the printer to be printed to. This may be accomplished by displaying a dropdown menu including the names of printers available on the network 505 and an option to store the job on the server instead of specifying one of the available printers. This option enables the user to select, at the time of printing, the printer to be used to print the job concerned from any of the available printers in the system, giving additional convenience and flexibility for users of the system. The print settings also include other items such as selection of paper size; selection of single-sided or double-sided printing; selection of finishings such as collated tray output, stapled output etc.; selection of paper source to be used by the printer; and selection of a quality style (text, publications, graphics, photos, designs (CAD).

Once the print settings are entered through a driver user interface, the user issues a print command in a step S1703. The print settings and other print attributes including the identity of the user creating the print job are stored on the client 501 or on the server 502 by the print manager 520, or at both locations. The identity of the user is typically available from the word-processing application or the operating system of the client 501. For the purposes of the following description it will be assumed that the user has selected to store the job on the server 502 rather than to print to a specific printer.

After receipt of the print command, the printer driver 510 converts the portion of the document to be printed selected in the step S1701 into a content file in the form of a postscript file. The printer driver then sends the postscript file to the print manager 520. The postscript file is sent to the server 520 via LAN 505.

The postscript file is received from the client 501 at the server 502. The postscript file is stored in a print queue at the server 502 in association with the print settings. The postscript file and print settings stored or handled in association with each other are hereinafter referred to as a print job. After receipt of the postscript file, the print manager 520 converts the print job into an Adobe® portable document format file (pdf file) or some other format usable by some or all of the printers in the system. The print manager may also generate some low-resolution preview images. The print job is stored in the print queue and the content of the print job is secure in the sense that it is not output from any printer at this stage. Thus, the content is kept confidential and cannot be accessed by other users.

Retrieval of a print job by the user who created the print job will now be described with reference to FIG. 18. In a step S1801, the user decides to print one or more print jobs and selects one of the printers in the system, for example the printer 503. This may be his or her usual printer or another printer convenient to wherever he or she is currently situated in the office. The log in in this embodiment is by placing an identity card against the card reader 536 of the printer 503, which logs the user onto the printer 503. Also in this embodiment, in a step S1802, the pre-print event detector 539 detects the log in as a pre-print event indicating that a print instruction is likely to be received at the printer 503. In response to the detection of the log in by the pre-print event detector 539, in a step S1803, the calibration unit 540 starts a calibration operation of the printer 503 before the print instruction is received.

After log in, the user is able to view a remote network interface of the print manager 520. In this embodiment the applet 530 is run on the printer 503. The applet is configured to display a series of panes on the printer's user interface 535. The applet 530 is configured to communicate with the print manager 520 using an XML based communication protocol. More particularly, after launch of the applet 530, a pane is displayed on the user interface 535 showing a list of jobs created by the user and stored by the print manager 520 in a step S1804. Associated with each print job on this list is a symbol representing the preview image generated for the print job in the step S1804. Upon selection of the symbol associated with a print job by the user, the corresponding preview image is downloaded to the printer 503 and is displayed on the user interface 535. In this way, a user can easily identify the content of print jobs displayed by the applet 530. The user selects a job to print or modify in a step S1805, and in a step S1806, the applet 530 displays a pane which shows the current settings for the selected print job. The user is able to vary or add additional print settings to the print job, for example by using drop-down menus. In a step S1807, the user issues the print instruction, for example by pressing a print button on an applet pane. If there are no unprintable attributes in the selected print job, the actuation of the print button causes the applet to send a request to the print manager 520 to send the print job to the printer 503. At the time of requesting the print job, the applet also sends an IP address of the printer 503 on the LAN and a serial number of the printer 503 to the print manager 520.

Once the print manager 520 receives the request for the print job, the print manager 520 determines the appropriate format (page description language PDL) for the printer 503 and, if the print job is not yet in that format, converts the print job into the appropriate format. The print job is then sent to the printer 503. Once the printer 503 receives the print job, the print job is printed according to the instructions in the print job and the user may then pick up the printed materials and log out from the printer.

In this embodiment, the steps S1804 to S1807 take a certain time period (several seconds or tens of seconds) for the user to complete. Thus, by detecting the log in of the user to the printer 503 in the step S1801, it is possible to make use of this time period to start, and possibly even complete, the calibration before the print instruction (actuation of the print button) is given.

The above description describes the case where the print job is stored on the server without selecting a printer at the time of creating the print job. However, the user may alternatively select the printer to be used for printing at the time of creating the print job at the client 501. After the user selects print in step S1703, a postscript file is generated and sent to the server 502 as described above. After receipt of the postscript file, the print manager 520 converts the postscript file into the appropriate PDL for the printer that the user selected to print to. After the print job is converted into the appropriate PDL format, the job is placed in a print queue associated with the printer selected by the user. The print job is held in the print queue until the user logs onto the selected printer. The same effects can be achieved in this case too, by detecting the log in of the user at the printer and starting the calibration in response to such detection. In this case, it is also possible to detect from the use of the document or file as the subject of the print job that a print instruction is likely to be received at the selected printer.

For example, the client 501 or the print server 502 can detect when the file (postscript file) is sent from the client 501 to the print server 502. This will give even more time to perform the calibration from when the print command is given at the client 501 to when the print instruction is given at the selected printer, as the time includes the time taken for the user to move from the location of the client 501 to the location of the selected printer and the log-in time.

Alternatively, the print server 502 or the selected printer can detect when the file (PDL file) is sent from the print server 502 to the selected printer. In some secure printing systems all the files created by the user and stored in the print server 502 are sent from the print server 502 to the selected printer when the user logs in to that printer. In such systems, it is effective to detect the sending of at least one file (e.g. the first file) from the print server to the selected printer and start calibration at this time.

As can be understood from the foregoing description, in variants of the fifth embodiment the pre-print event detector may be provided wholly or in part outside the printer, for example in or partly in the client 501 or print server 502. When the pre-print event is detected by a pre-print event detector outside the printer the detection by the external detector is notified in some suitable manner to the calibration unit 540 via the LAN 505.

It will also be understood that logging in of the user can be accomplished by means other than a card reader. For example, the printer apparatus may have a keyboard by means of which the user can log in by typing a user name and password.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-110720, filed Apr. 30, 2009, which hereby incorporated by reference herein in its entirety.

What is claimed is:

1. An image forming apparatus that is capable of having a portable storage medium connected to, comprising: a detection unit adapted to detect whether or not the portable storage medium is mounted in the image forming apparatus; a reading unit adapted to read data stored in the portable storage medium which is detected to be mounted; an image forming unit adapted to perform an image forming operation according to the read data; a calibration execution unit adapted to execute calibration of said image forming unit; a determination unit adapted to determine an attribute of the portable storage medium or attributes of data stored in the portable storage medium, in response to the detection of the portable storage medium being mounted by said detection unit; and a control unit adapted to perform control based on a result of determination by said determination unit such that said calibration execution unit is selectively caused to start the calibration, wherein said control unit is adapted to cause said calibration execution unit to execute the calibration, before said image forming unit receives an instruction from a user for performing the image forming operation, based on the data read from the portable storage medium, wherein said determination unit is adapted to determine whether or not one or more predetermined conditions are satisfied, the predetermined conditions including at least one of a first condition that a stored file contains additional information indicating that the file content is captured by using an image pickup apparatus, a second condition that a color specification command is specified to the file, and a third condition that the portable storage medium is set to write inhibit; and said control unit is adapted to cause said calibration execution unit to start the calibration if it is determined by said determination unit that said one or more predetermined conditions are satisfied.

2. The image forming apparatus according to claim 1, wherein the first condition is a condition that the data stored in the portable storage medium includes a JPEG file having an Exif format, and wherein the second condition is a condition that the data stored in the portable storage medium includes a PDF file in which a color setting operator is specified.

3. The image forming apparatus according to claim 1, wherein said control unit is adapted to inhibit said calibration execution unit from executing calibration if a count of image-formed sheets after said calibration execution unit executed the calibration on a preceding occasion is not more than a predetermined number.

4. The image forming apparatus according to claim 1, further comprising a setting unit adapted to set whether or not to inhibit said calibration execution unit from executing the calibration execution, and wherein said control unit inhibits said calibration execution unit from operating if said setting unit has set inhibition of execution of the calibration.

5. The image forming apparatus according to claim 1, wherein said calibration execution unit is capable of executing the calibration in one of a simplified correction mode in which the calibration can be performed within a first processing time period, and a complete correction mode in which it takes a longer time period than the first processing time period to perform the calibration, and the apparatus further comprises a mode setting unit adapted to set which one of the simplified and complete correction modes is to be used to execute the calibration.

6. The image forming apparatus according to claim 1, wherein the control unit is operable, when the detected memory medium is of a first type, to perform control based on a result of determination by said determination unit such that said calibration execution unit is selectively caused to start the calibration, and the control unit is further operable, when the detected memory medium is of a second type different from said first type, to perform control such that said calibration execution unit is caused to start the calibration without such determination by said determination unit.

7. A method of controlling an image forming apparatus that is capable of having a portable storage medium mounted therein, the image forming apparatus including an image forming unit adapted to perform an image forming operation according to data read from the portable storage medium, and a calibration execution unit adapted to execute calibration of the image forming unit, comprising: detecting whether or not the portable storage medium is mounted in the image forming apparatus; determining an attribute of the portable storage medium or attributes of data stored in the portable storage medium, in response to the detection of the portable storage medium being mounted; and performing control based on a result of determination by said determining such that the calibration execution unit is selectively caused to start the calibration, wherein the calibration is executed, before said image forming unit receives an instruction from a user for performing the image forming operation, based on the data read from the portable storage medium, wherein said determining further includes determining whether or not one or more predetermined conditions are satisfied, the predetermined conditions including at least one of a first condition that a stored file contains additional information indicating that the file content is captured by using an image pickup apparatus, a second condition that a color specification command is specified to the file, and a third condition that the portable storage medium is set to write inhibit; and said performing control includes causing said calibration execution unit to start the calibration if it is determined by said determining that said one or more predetermined conditions are satisfied.

8. A non-transitory computer-readable storage medium which stores a computer-readable program for causing a computer to execute a method of controlling an image forming apparatus that is capable of having a portable storage medium mounted therein, the image forming apparatus including an image forming unit adapted to perform an image forming operation according to data read from the portable storage medium, and a calibration execution unit adapted to execute calibration of the image forming unit, wherein the method comprises: detecting whether or not the portable storage medium is mounted in the image forming apparatus; determining an attribute of the portable storage medium or attributes of data stored in the portable storage medium, in response to the detection of the portable storage medium being mounted; and performing control based on a result of determination by said determining such that the calibration execution unit is selectively caused to start the calibration, wherein the calibration is executed, before said image forming unit receives an instruction from a user for performing the image forming operation, based on the data read from the portable storage medium, wherein said determining further includes determining whether or not one or more predetermined conditions are satisfied, the predetermined conditions including at least one of a first condition that a stored file contains additional information indicating that the file content is captured by using an image pickup apparatus, a second condition that a color specification command is specified to the file, and a third condition that the portable storage medium is set to write inhibit; and said performing control includes causing said calibration execution unit to start the calibration if it is determined by said determining that said one or more predetermined conditions are satisfied.

9. An image forming apparatus capable of having a memory card connected thereto, the apparatus comprising: a detector which detects when such a memory card is connected to the apparatus; a calibration unit which causes calibration of the image forming apparatus to start automatically in response to the detection of such a memory card by the detector; a determination unit which is adapted to determine whether or not one or more predetermined conditions are satisfied, the predetermined conditions including at least one of a first condition that a stored file contains additional information indicating that the file content is captured by using an image pickup apparatus, a second condition that a color specification command is specified to the file, and a third condition that the portable storage medium is set to write inhibit; and a control unit is adapted to cause said calibration unit to start the calibration if it is determined by said determination unit that said one or more predetermined conditions are satisfied, wherein the calibration is started prior to receiving an instruction from a user to print a received document or file.

10. An image forming apparatus capable of having first and second different types of external memory media connected thereto, the apparatus comprising: a detector which detects when a memory medium of either of the types is connected to the apparatus and which type of memory medium is connected; a calibration unit which causes calibration of the image forming apparatus to start automatically when it is detected by said detector that a memory medium of the first type is connected and which causes calibration of the image forming apparatus to start selectively when it is detected by said detector that a memory medium of the second type is connected; a determination unit which determines whether or not one or more predetermined conditions are satisfied, the predetermined conditions including at least one of a first condition that a stored file contains additional information indicating that the file content is captured by using an image pickup apparatus, a second condition that a color specification command is specified to the file, and a third condition that the portable storage medium is set to write inhibit; and a control unit is adapted to cause said calibration unit to start the calibration if it is determined by said determination unit that said one or more predetermined conditions are satisfied, wherein the calibration is started prior to receiving an instruction from a user to print a received document or file.

* * * * *